(12) United States Patent
Cooney et al.

(10) Patent No.: US 6,885,821 B2
(45) Date of Patent: Apr. 26, 2005

(54) FULL-DUPLEX OPTICAL ADD/DROP COMMUNICATIONS SYSTEM UTILIZING CENTRAL LIGHT SOURCES

(75) Inventors: Thomas F. Cooney, Milpitas, CA (US); Simon Xiaofan Cao, Fremont, CA (US)

(73) Assignee: Avanex Corporation, Fremont, CA (US)

( * ) Notice: Subject to any disclaimer, the term of this patent is extended or adjusted under 35 U.S.C. 154(b) by 552 days.

(21) Appl. No.: 09/794,368

(22) Filed: Feb. 27, 2001

(65) Prior Publication Data

US 2002/0118411 A1 Aug. 29, 2002

(51) Int. Cl.[7] .............................................. H04J 14/00
(52) U.S. Cl. ..................... 398/45; 398/41; 398/42; 398/43; 398/58; 398/65; 398/71; 398/82; 359/65; 359/126; 359/495; 359/496; 359/497; 359/498
(58) Field of Search ...................... 398/41, 43, 45, 398/58, 65, 71, 82, 86, 42, 83, 68; 359/495–498, 65, 126

(56) References Cited

U.S. PATENT DOCUMENTS

| | | | |
|---|---|---|---|
| 5,653,008 A | | 8/1997 | Sim et al. |
| 5,694,233 A | | 12/1997 | Wu et al. |
| 5,717,795 A | * | 2/1998 | Sharma et al. ............... 385/24 |
| 5,764,821 A | * | 6/1998 | Glance ........................ 385/14 |
| 5,912,748 A | | 6/1999 | Wu et al. |
| 5,915,051 A | * | 6/1999 | Damask et al. .............. 385/16 |
| 5,978,116 A | | 11/1999 | Wu et al. |
| 6,061,157 A | * | 5/2000 | Terahara ..................... 398/1 |
| 6,163,633 A | | 12/2000 | Ueda |
| 6,426,815 B1 | * | 7/2002 | Koehler ...................... 398/59 |
| 6,476,946 B1 | * | 11/2002 | Bruyere et al. .............. 398/82 |
| 6,493,117 B1 | * | 12/2002 | Milton et al. ............... 398/49 |
| 6,512,864 B1 | * | 1/2003 | Lin et al. .................... 385/24 |
| 6,525,848 B1 | * | 2/2003 | Cao .......................... 359/107 |
| 6,614,567 B1 | * | 9/2003 | Al-Salameh et al. ......... 398/79 |
| 6,614,573 B1 | * | 9/2003 | Cao .......................... 359/246 |

\* cited by examiner

*Primary Examiner*—Jason Chan
*Assistant Examiner*—Chau M. Nguyen
(74) *Attorney, Agent, or Firm*—Moser, Patterson & Sheridan, L.L.P.

(57) ABSTRACT

The present invention provides an improved full-duplex optical communications system. The system includes: at least one office, where the at least one office provides a plurality of channels, the plurality of channels comprising a plurality of signal channels and a plurality of continuous wave (CW) channels; at least one optical add/drop multiplexer (OADM) optically coupled to the at least one office; and a subscriber premises optically coupled to the at least one OADM, where at least one of the plurality of signal channels and at least one of the plurality of CW channels are dropped from the plurality of channels to the subscriber premises by the at least one OADM, where the subscriber premises modulates the dropped at least one of the plurality of CW channels, where the modulated at least one of the plurality of CW channels is added to the plurality of channels by the at least one OADM.

47 Claims, 15 Drawing Sheets

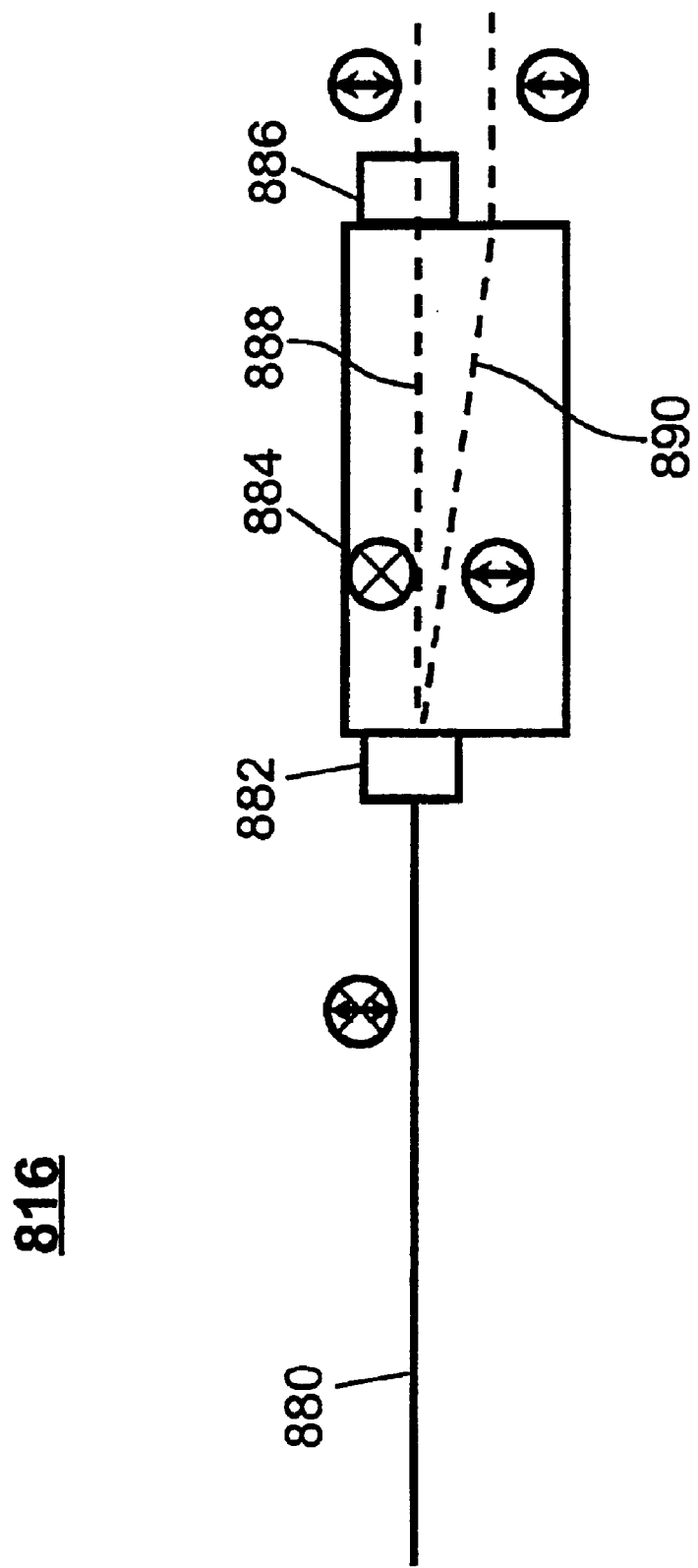

FULL-DUPLEX OPTICAL ADD/DROP COMMUNICATIONS SYSTEM UTILIZING CENTRAL LIGHT SOURCES

FIELD OF THE INVENTION

The present invention relates to optical communications systems, and more particularly to utilizing wavelength division multiplexing and optical add/drop multiplexing for two-way communications between a central office and customer or subscriber premises.

BACKGROUND OF THE INVENTION

The use of optical fiber for long-distance transmission of voice and/or data is now common. As the demand for data carrying capacity continues to increase, there is a continuing need to utilize the bandwidth of existing fiber-optic cable more efficiently. An established method for increasing the carrying capacity of existing fiber cable is Wavelength Division Multiplexing (WDM) in which multiple information channels are independently transmitted over the same fiber using multiple wavelengths of light. In this practice, each light-wave-propagated information channel corresponds to light within a specific wavelength range or "band."

In this specification, the individual information-carrying lights within a WDM optical communications system are referred to as either "signals" or "channels." The term "channel" is also utilized herein to refer to a continuous-wave (CW) light within a restricted wavelength band that is carried by an optical fiber. Such a CW light is not modulated and does not carry information (other than the information of its own existence) and therefore cannot be properly referred to as a "signal". In general, however, modulation may be imposed upon a CW light carried by an optical fiber communications system. This modulation imparts information to the light and will, in general, be performed at some location remote from the original source of the light. At this point, the light becomes a "signal" and is no longer a "CW" light. The new signal resides within the same wavelength band as the original CW light from which it was formed. Downstream modulation of CW light sources in this fashion is a characteristic of an optical communications system comprising centralized light sources.

The totality of multiple combined signals in a wavelength-division multiplexed optical fiber, optical line or optical system, wherein each signal is of a different wavelength range, is herein referred to as a "composite optical signal." The totality of channels carried by an optical fiber, optical line or optical system, without regard to whether the channels comprise signals or CW lights, is referred to herein as a "composite optical transmission". The term "wavelength," denoted by the Greek letter λ (lambda) is used synonymously with the terms "signal" or "channel" and may refer to either a signal-carrying light or a CW light. Although each information carrying channel actually comprises light of a certain range of physical wavelengths, for simplicity, a single channel is referred to as a single wavelength, λ, and a plurality of n such channels are referred to as "n wavelengths" denoted $\lambda_1 - \lambda_n$.

In most communications systems, it is desirable to provide for full-duplex communications—that is, simultaneous information transfer from a first point to a second point and from the second point back to the first point. In conventional fiber optic communications systems, such full-duplex communication is accomplished by providing both a light source ("transmitter") and a light detector ("receiver") at both the first point and the second point. Information to be transferred from, for instance, a central office to customer or subscriber premises, is converted from electrical format to optical format and the optical formatted signal is transferred along a fiber optic communications system to the customer or subscriber premises. The receiver at the customer or subscriber premises converts the optical formatted information back to electrical format for conveyance to its final destination (a data reception device such as a computer). Any return or response information generated at the customer premises is generated as an electrical signal, transformed to an optical signal by a separate transmitter at the customer premises, and transferred back to a central office over the fiber optic communications system.

Historically, the conventional communications system described above has served its purposes well. However, this conventional system requires light sources at each customer or subscriber location. The provision of and maintenance of a separate light source at each such remote location is costly and wasteful of resources, especially as the number of channels and total data traffic increases within the communications system.

Accordingly, there exists a need for an improved full-duplex optical communications system. The system should not require separate light sources at customer or subscriber premises. The present invention addresses such a need.

SUMMARY OF THE INVENTION

The present invention provides an improved full-duplex optical communications system. The system includes: at least one office, where the at least one office provides a plurality of channels, the plurality of channels comprising a plurality of signal channels and a plurality of continuous wave (CW) channels; at least one optical add/drop multiplexer (OADM) optically coupled to the at least one office; and a subscriber premises optically coupled to the at least one OADM, where at least one of the plurality of signal channels and at least one of the plurality of CW channels are dropped from the plurality of channels to the subscriber premises by the at least one OADM, where the subscriber premises modulates the dropped at least one of the plurality of CW channels, where the modulated at least one of the plurality of CW channels is added to the plurality of channels by the at least one OADM.

BRIEF DESCRIPTION OF THE FIGURES

FIG. 9 illustrates a polarizing port utilized within the switchable interleaved channel separator device shown in FIGS. 8a–8b.

DETAILED DESCRIPTION

The present invention provides an improved full-duplex optical communications system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1a through 10c in conjunction with the discussion below.

Figure 1A:
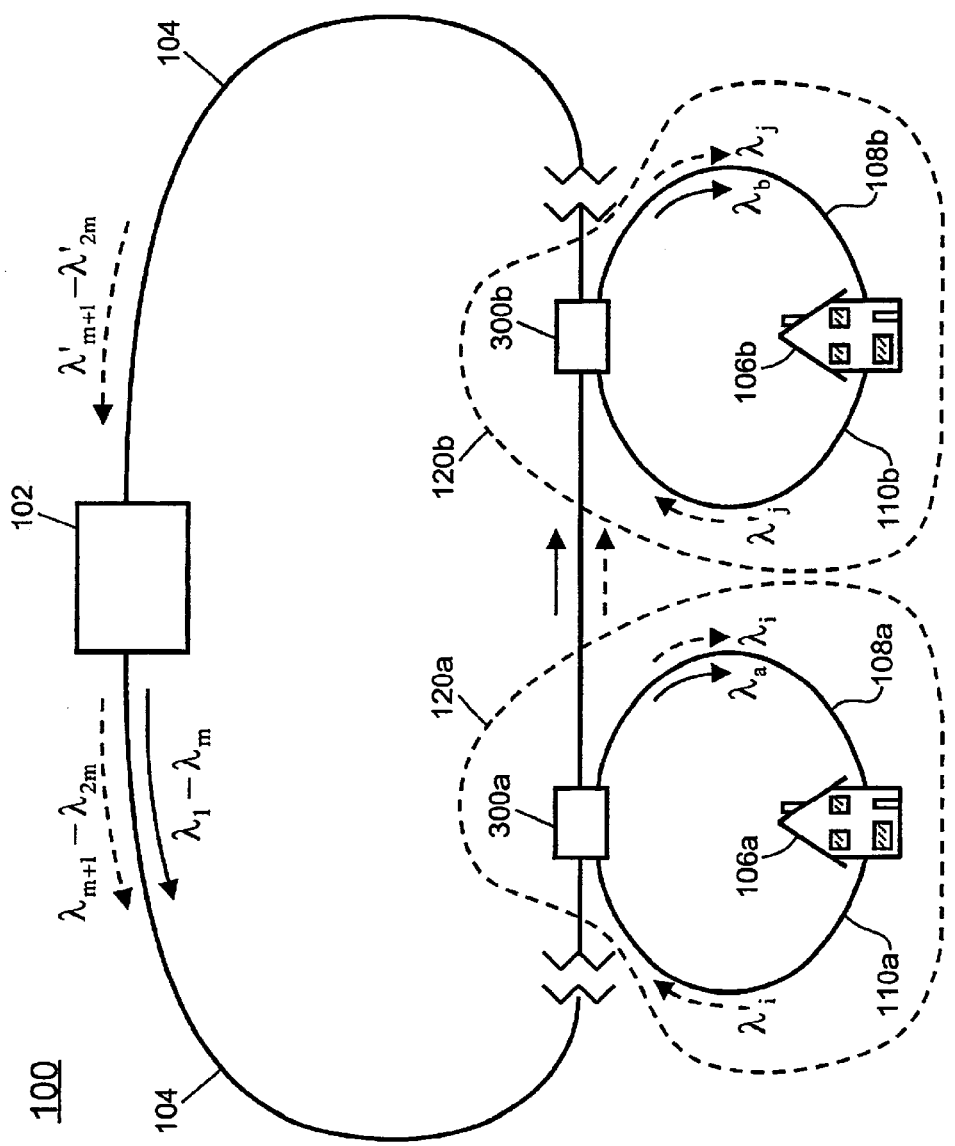
FIGS. 1a–1b respectively illustrate a first and second preferred embodiment of a full-duplex optical communications system in accordance with the present invention.
Figure 1B:
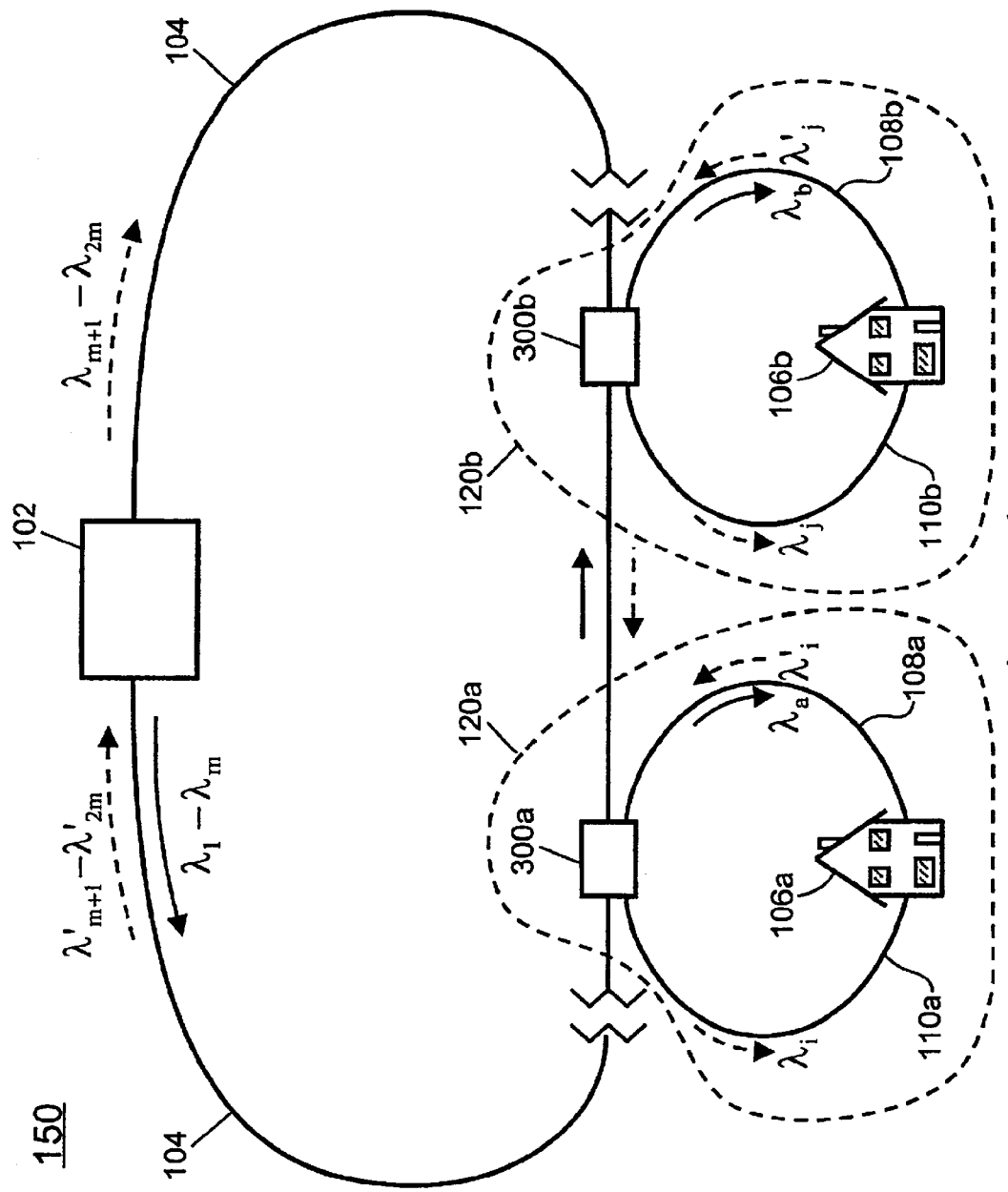

FIGS. 1a–1b illustrate respectively a first and second preferred embodiment of a full-duplex optical communications system in accordance with the present invention. Both the system 100 (FIG. 1a) and the system 150 (FIG. 1b) comprise a loop configuration comprising a fiber optic loop 104, a central office 102 and a plurality of nodes 120a, 120b, etc. Only two such nodes 120a and 120b are illustrated in FIGS. 1a–1b. The central office 102 and the nodes 120a, 120b, . . . are all optically coupled to the fiber-optic loop 104, which comprises one or more spans of optical fiber linking the central office 102 to the plurality of nodes 120a, 120b, . . . and the individual nodes to one another.

Each node within either the system 100 (FIG. 1a) or the system 150 (FIG. 1b) comprises a respective one of a plurality of Optical Add/Drop Multiplexers (OADM) 300a, 300b, . . . , one of a plurality of customer or subscriber premises 106a, 106b, . . . , a respective one of a plurality of first optical connection lines 108a, 108b, . . . and a respective one of a plurality of second optical connection lines 110a, 110b, etc. The central office 102 provides 2 m channels (m an integer; m≧1) to the fiber-optic loop 104, wherein each channel comprises a wavelength different from those of the remaining channels. Upon being output from the central office, one half, m, of these channels ($\lambda_1$–$\lambda_m$) comprise signals and the remaining m channels ($\lambda_{m+1}$–$\lambda_{2m}$) comprise CW lights. Typical signal channels are represented as $\lambda_a$ and $\lambda_b$; typical CW channels are represented as $\lambda_i$ and $\lambda_j$; signals resulting from modulation of the channels $\lambda_i$ and $\lambda_j$ are represented by $\lambda'_i$ and $\lambda'_j$, respectively.

In the system 100 (FIG. 1a), the signal channels ($\lambda_1$–$\lambda_m$) and the CW channels ($\lambda_{m+1}$–$\lambda_{2m}$) all propagate with the same logical circulation direction (e.g., counterclockwise) through the loop 104. In the system 150 (FIG. 1b), the signal channels ($\lambda_1$–$\lambda_m$) propagate in a first logical circulation direction (e.g., counterclockwise) through the loop 104 whilst the CW channels ($\lambda_{m+1}$–$\lambda_{2m}$) propagate in the opposite logical circulation direction (e.g., clockwise).

In operation of either the system 100 (FIG. 1a) or the system 150 (FIG. 1b), the OADM 300a, 300b, . . . comprising each node outputs or "drops" two channels one signal channel and one CW channel to the customer or subscriber premises 106a, 106b, . . . comprising the node. Preferably a unique signal channel and a unique CW channel are dropped at each node. For instance, the OADM 300a comprising the system node 120a outputs the signal channel $\lambda_a$ and the CW channel $\lambda_i$ to the customer premises 106a and the OADM 300b comprising the system node 120b outputs the different signal channel $\lambda_b$ and the different CW channel $\lambda_j$ to the customer-premises 106b. In the system 100, the two channels dropped at each node propagate to the customer premises comprising the node along the same optical connection line, for instance, the first optical connection lines 108a and 108b in FIG. 1a. In the system 150, the two channels dropped at each node propagate along different optical connection lines. For instance, as shown in FIG. 1b, the signal channel $\lambda_n$ is dropped to the customer premises 106a along the first optical connection line 108a whilst the CW channel $\lambda_i$ is dropped to the customer premises 106a along the second optical connection line 110a.

The customer or subscriber premises 106a, 106b, . . . comprising each node 120a, 120b, receives information from the central office 102 via the particular signal channel dropped to its location. Any information to be delivered from the customer premises 106a, 106b, . . . back to the central office 102 is imparted to the CW channel through modulation of that channel at the customer premises 106a, 106b, . . . In this fashion, there is no requirement for having a light source at any of the nodes. The resulting new signal is returned to the OADM 300a, 300b, . . . comprising the respective node 102a, 120b, . . . , at which it is returned ("added") to the fiber-optic loop 104 so as to be returned to the central office 102. For instance, in both the systems 100 (FIG. 1a) and 150 (FIG. 1b), the CW channel $\lambda_i$ is modulated at the customer premises 106a comprising node 120a so as to become the new signal channel $\lambda_i'$. This new signal channel $\lambda_i'$ is returned to the OADM 300a via the second optical connection line 110a within the system 100 (FIG. 1a) and via the first optical connection line 108a within the system 150 (FIG. 1b).

Preferably, the OADM 300a, 300b, . . . comprising each node 120a, 120b, . . . within either the system 100 or the system 150 drops a unique signal channel and a unique CW channel different than the channels dropped at any other one of the nodes. The remaining, non-dropped channels propagate through the node to the next node in the sequence of nodes or back to the central office 102. In this fashion, each signal channel from the composite optical signal ($\lambda_1$–$\lambda_m$) and each CW channel from the composite optical transmission. ($\lambda_{m+1}$–$\lambda_{2m}$) propagates through the system 100 or 150 without being dropped until it reaches its respective destination node.

Subsequent to being dropped to and utilized at a customer or subscriber premises 106a, 106b, . . . . at its destination node within either the system 100 or the system 150, a signal channel is preferably discarded, although it could be returned to the fiber optic loop 104 so as to continue on to other nodes or to the central office 102. Subsequent to being added to the fiber optic loop 104 at its destination node, the new signal created by modulation of a CW channel propagates through the remaining chain of nodes until it ultimately returns to the central office 102. At the central office 102, information provided from all the customer or subscriber premises 106a, 106b, . . . is received and processed. Preferably, the central office 102 comprises m optical receivers so as to receive these returned signals. As an example of the operation of the system 100 as illustrated in FIG. 1a, the new signal channel $\lambda'_i$ created by modulation of the CW channel $\lambda_i$ at customer premises 106a is returned to the loop 104 by the OADM 300a whereas the signal channel $\lambda_a$ is discarded after being received at the customer premises 106a. The new signal channel $\lambda'_i$ passes through, undropped, each of the successive nodes in the loop 104 back to the central office 102. Meanwhile, a different signal channel from amongst the signal channels ($\lambda_1$–$\lambda_m$) and a different CW channel from amongst the CW channels ($\lambda_{m+1}$–$\lambda_{2m}$) is dropped at each one of these successive nodes and a new signal channel is added. For instance, the new signal $\lambda'_j$, created by modulation of the original CW channel $\lambda_j$ is added at the node 120b. Finally, the composite optical signal that returns to the central office 102 comprises the set of new signal channels ($\lambda'_{m+1}$–$\lambda'_{2m}$) and none of the original signal channels ($\lambda_1$–$\lambda_m$).

Figure 2:
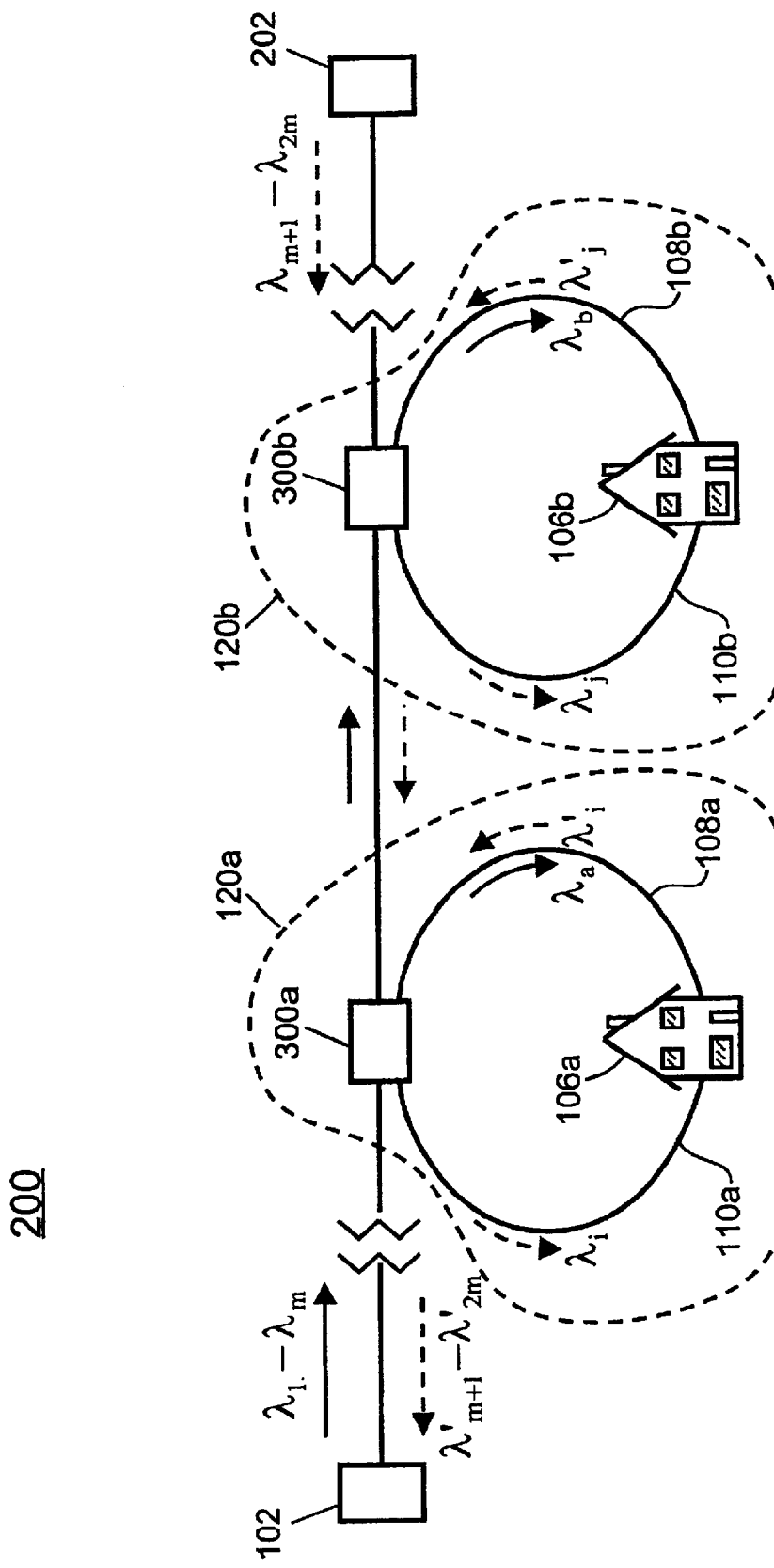
FIG. 2 illustrates a third preferred embodiment of a full-duplex optical communications system in accordance with the present invention.

FIG. 2 illustrates a third preferred embodiment of a full-duplex optical communications system in accordance with the present invention. The system 200 illustrated in FIG. 2 is constructed and operates similarly to the system 150 (FIG. 1b) except that the system 200 is open ended, i.e., there is only one optical coupling between the central office 102 and the rest of the system 200. Accordingly, the central office 102 only comprises light sources for the signal channels ($\lambda_1$–$\lambda_m$). Light sources for the CW channels ($\lambda_{m+1}$–$\lambda_{2m}$) located at a remote office 202. In the system 200 (FIG. 2), the CW channels ($\lambda_{m+1}$–$\lambda_{2m}$) and the new signals ($\lambda'_{m+1}$–$\lambda'_{2m}$) created by modulation of the CW channels propagate through the system 200 oppositely to the signal channels ($\lambda_1$–$\lambda_m$).

Figure 3A:
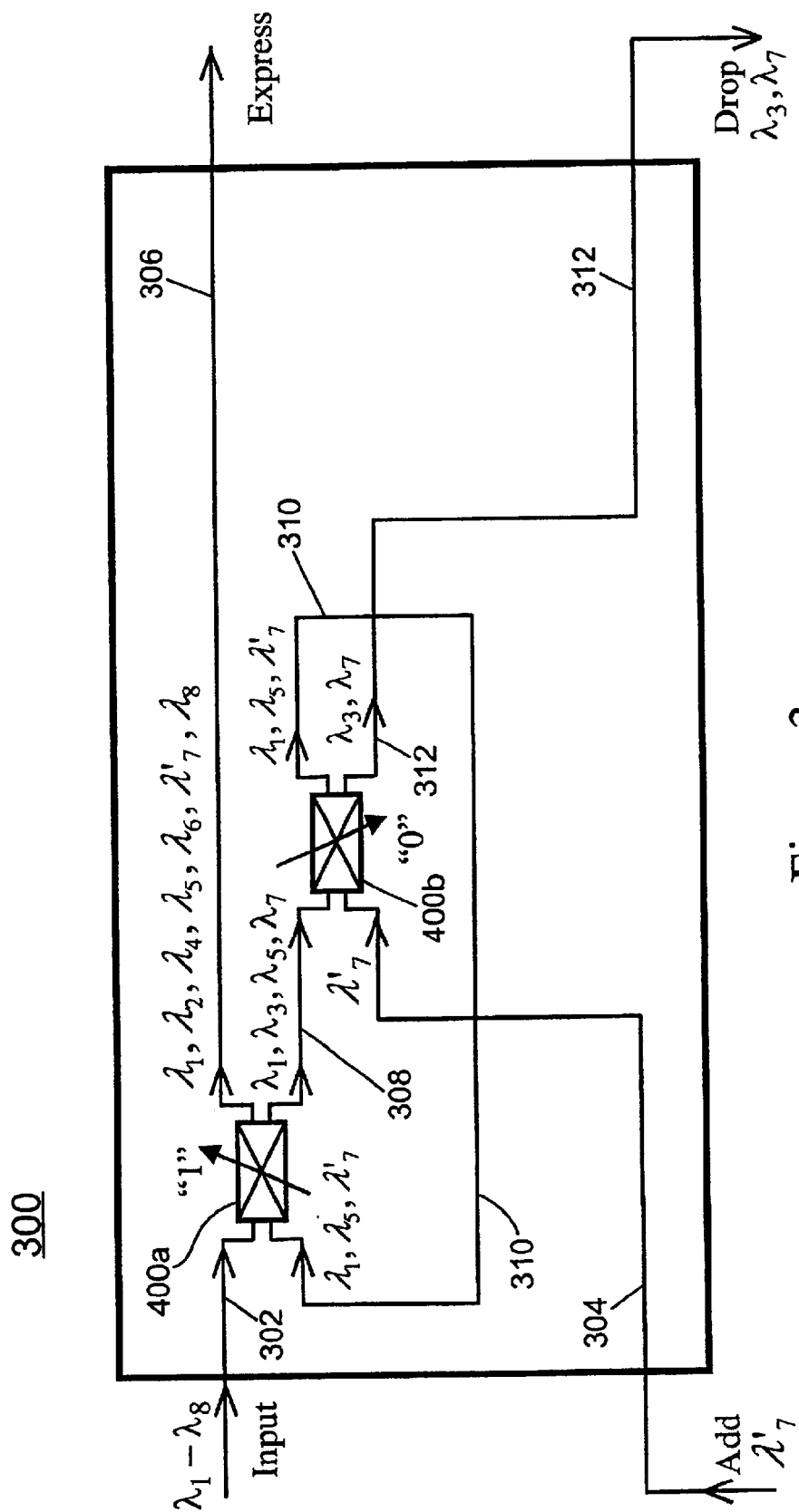
FIGS. 3a–3b illustration a preferred embodiment of an optical add/drop multiplexer (OADM) that may be used within the full-duplex optical communications system in accordance with the present invention.
Figure 3B:
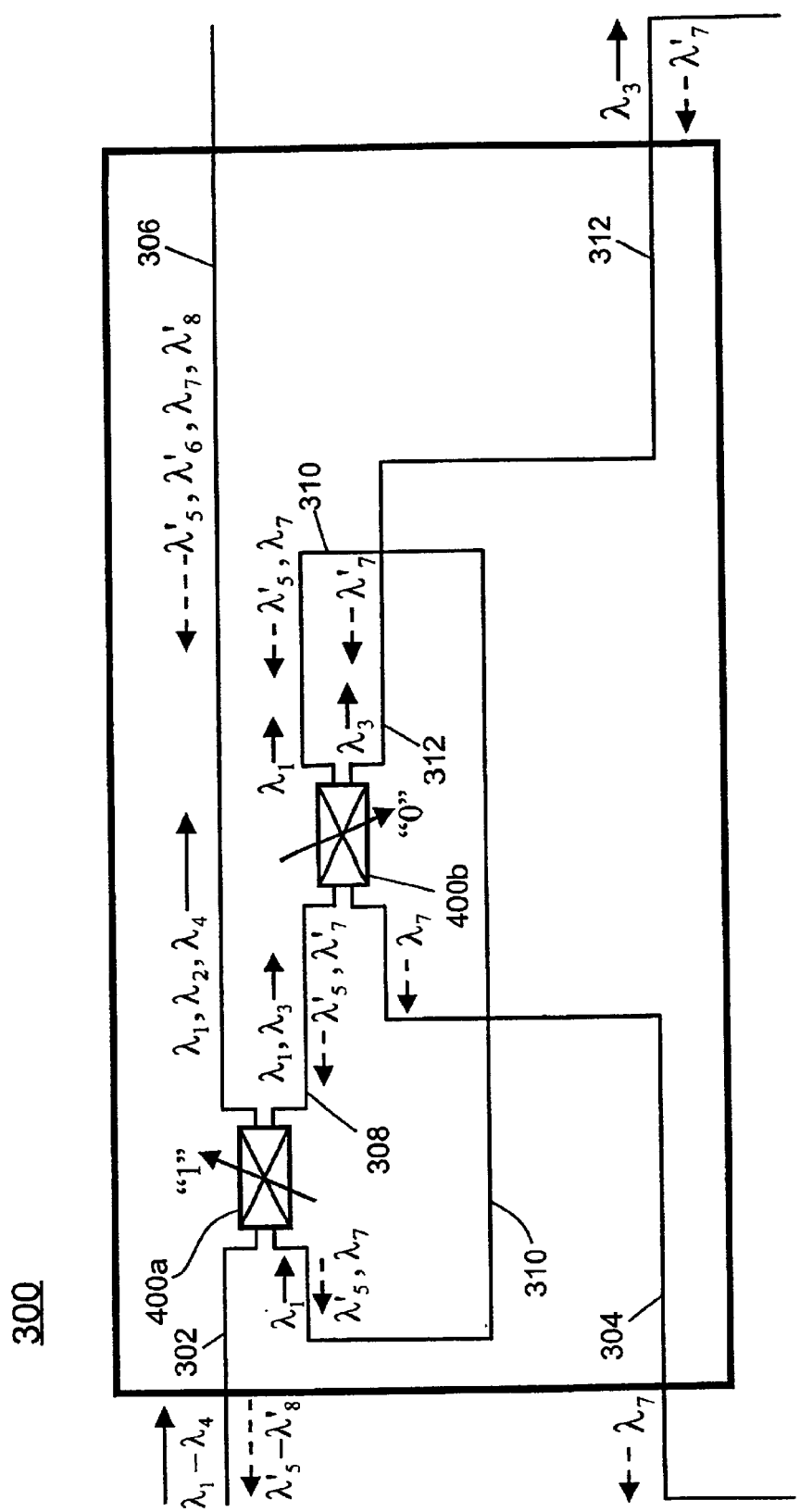
Figure 4:
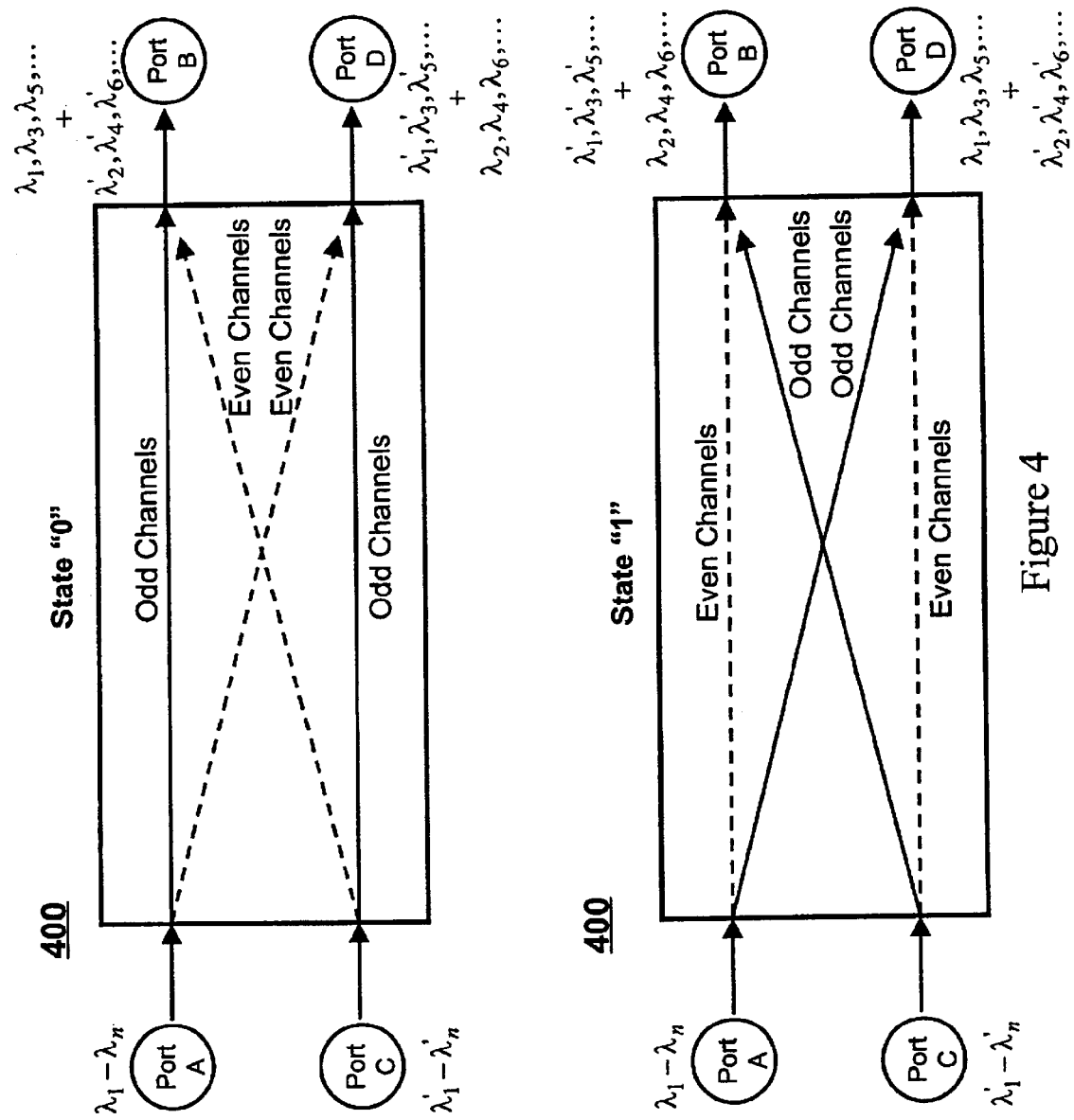
FIG. 4 is a functional channel routing diagram of a 2×2 switchable interleaved channel separator device as utilized within the full-duplex optical communications system in accordance with the present invention.

FIGS. 3a–3b illustrate a preferred embodiment of an OADM that may be used in the full-duplex optical communications system in accordance with the present invention. The OADM 300 (FIGS. 3a–3b) comprises a plurality of 2×2 switchable interleaved channel separator devices 400a, 400b, . . . each of which may function as a 2×2 switch. Each of the 2×2 switchable interleaved channel separator devices 400a, 400b, . . . comprises a first switch state "0" and a second switch state "1" as illustrated in FIG. 4 and described in more detail with reference to that figure.

FIGS. 3a–3b illustrate two different operational examples of the OADM 300 wherein there are a total of eight channels (that is, m=4) and, accordingly, the channels $\lambda_1$–$\lambda_4$ and the channels $\lambda_5$–$\lambda_8$ respectively comprise the signal channels and the CW channels output from the central office 102. For eight total channels, two switchable interleaved channel separator devices 400a–400b are required within the OADM 300. FIG. 3a illustrates the pathways of channels through the OADM 300 when this OADM 300 is utilized within the system 100. FIG. 3b illustrates the pathways of channels through the OADM 300 when this OADM is utilized within either the system 150 or the system 200.

Referring now to the example shown in FIG. 3a, it is assumed that a composite optical transmission comprising channels $\lambda_1$–$\lambda_8$ is input into the OADM 300 via an optical input 302. The optical input 302 is optically coupled to the fiber optic loop 104 within the system 100. The first 2×2 switchable interleaved channel separator device 400a separates the input composite optical transmission into its odd ($\lambda_1$, $\lambda_3$, $\lambda_5$, $\lambda_7$) and even ($\lambda_2$, $\lambda_4$, $\lambda_6$, $\lambda_8$) channels. Since the device 400a is in a state "1" (in this example), the odd channels are directed, via optical coupling 308, to the second 2×2 switchable interleaved channel separator 400b, which further separates them into two sets of channels, ($\lambda_1$, $\lambda_5$) and ($\lambda_3$, $\lambda_7$). Since the device 400b is in a state "0", the ($\lambda_3$, $\lambda_7$) set of channels is directed to the drop line 312. The drop line 312 is optically coupled to one of the plurality of first optical connection lines 108a, 108b, . . . within the system 100. A new signal $\lambda'_7$ comprising the same wavelength as $\lambda_7$ is simultaneously added as an input into the device 400b from the add line 304. The add line 312 is optically coupled to one of the plurality of second optical connection lines 110a, 110b, . . . within the system 100. Since the device 400b acts as a 2×2 switch and is in the state "0" as described previously, channel $\lambda'_7$ is then added to channels $\lambda_1$ and $\lambda_5$ by the device 400b. These combined channels are looped back, via optical coupling 310, as an input to the device 400a, which, since it is in state "1", adds channels $\lambda_1$, $\lambda_5$, $\lambda'_7$ to channels $\lambda_2$, $\lambda_4$, $\lambda_6$, $\lambda_8$ resulting in one composite optical transmission containing channels $\lambda_1$, $\lambda_2$, $\lambda_4$, $\lambda_5$, $\lambda_6$, $\lambda'_7$, and $\lambda_8$. This new signal is then output from the OADM 300 along the express line 306, which is optically coupled to the fiber optic loop 104 of the system 100. Thus, in this manner, channels $\lambda_3$ and $\lambda_7$ are dropped while the channel $\lambda_7$ is modulated to become channel $\lambda'_7$ which is then returned to the system 100.

In the example shown in FIG. 3b, it is to be noted that the pathways of the channels $\lambda_5$–$\lambda_8$ (or equivalently $\lambda'_5$–$\lambda'_8$) through the OADM 300 are exactly opposite to the pathways of these same channels as illustrated in FIG. 3a. Thus, the operation of the OADM 300 when utilized as shown in FIG. 3b is not described in detail. The OADM 300 can only be used in the configuration shown in FIG. 3b when the pathways through all of the 2×2 switchable interleaved channel separators 400a, 400b, . . . are reversible as described in more detail following with reference to FIG. 4.

FIG. 4 is a functional channel routing diagram of a 2×2 switchable interleaved channel separator device as utilized within the full-duplex optical communications system in accordance with the present invention. Specific embodiments of this 2×2 switchable interleaved channel separator device are described subsequently. The switchable interleaved channel separator device 400 can be operated in either a first operational configuration, state "0" or in a second operational configuration, state "1", as shown in the upper and lower diagrams of FIG. 4, respectively. In the state "0", odd-channels input to the switchable interleaved channel separator device 400 from Port A and from Port C are directed to Port B and to Port D, respectively, whereas even channels input to the switchable interleaved channel separator device 400 from Port A and from Port C are directed to Port D and to Port B, respectively.

For instance, as shown in the upper diagram of FIG. 4, in the state "0" the output at Port B consists of the odd channels ($\lambda_1$, $\lambda_3$, $\lambda_5$, . . . ) from the first composite optical transmission $\lambda_1$–$\lambda_n$ input at Port A plus the even channels ($\lambda_2'$, $\lambda_4'$, $\lambda_6'$ . . . ) from the second composite optical transmission $\lambda_1'$–$\lambda_n'$ input at Port C. Further, in the state "0", the output at Port D consists of the odd channels ($\lambda_1'$, $\lambda_3'$, $\lambda_5'$ . . . ) from the second composite optical transmission plus the even channels ($\lambda_2$, $\lambda_4$, $\lambda_6$ . . . ) from the first composite optical transmission. In the state "1", the pathways of the odd channels and the even channels are reversed from those in the state "0" as shown in the lower diagram of FIG. 4. In this way, the device 400 functions as a dense wavelength division multiplexer and de-multiplexer that discriminates amongst the pathways of odd and even channels and also functions as a 2×2 switch. The 2×2 switchable interleaved channel separator device is reversible provided that channels input from the Port B and the Port D follow the pathways shown in exactly the reverse direction to the Port A and the Port C. Some embodiments of the apparatus 400 described below are reversible and other embodiments are non-reversible.

Figure 5:
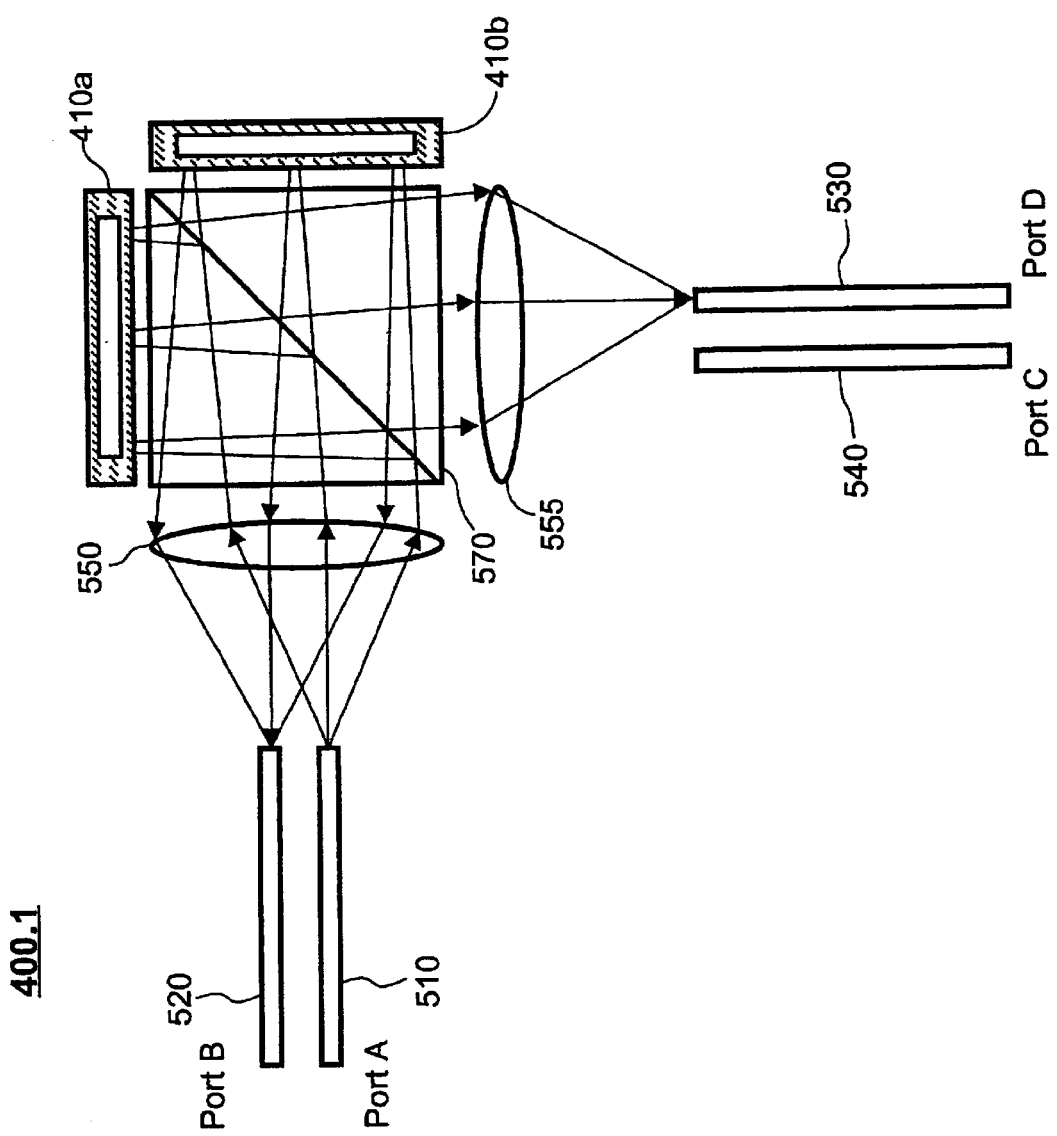
FIG. 5 illustrates a first preferred embodiment of a 2×2 switchable interleaved channel separator device that may be used within the full-duplex optical communications system in accordance with the present invention.

FIG. 5 illustrates a first preferred embodiment of a 2×2 switchable interleaved channel separator device that may be utilized within the full-duplex optical communications systems in accordance with the present invention. The switchable interleaved channel separator device 400.1, shown in FIG. 5, is a modified version of a device disclosed in U.S. Pat. No. 6,130,971, as well as in a co-pending U.S. patent application entitled "Dense Wavelength Division Multiplexer Utilizing an Asymmetric Pass Band. Interferometer" Ser. No. 09/388,350, filed Sep. 1, 1999, both of which are assigned to the assignee of the present application and which are incorporated herein by reference in their entirety. The 2×2 switchable interleaved channel separator device 400.1 (FIG. 5) comprises a first input optical fiber 510 and a second input optical fiber 540 for inputting optical channels and first 520 and second 530 output optical fibers for outputting optical channels. As an input composite optical transmission leaves the first input optical fiber 510, it diverges. A first lens 550 collimates the input composite optical transmission and directs it toward a polarization beam splitter 570 which decomposes the channel into two sub-signals having mutually orthogonal polarizations. The s-polarized portion of the input composite optical transmission polarized parallel to a plane in the polarization beam splitter 570 is reflected towards a first adjustable non-linear interferometer 410a. The p-polarized portion of the channel polarized perpendicularly to the plane in the polarization beam splitter 570 passes through towards a second adjustable non-linear interferometer 410b.

Each of the adjustable non-linear interferometers 410a and 410b comprising the switchable interleaved channel separator device 400.1 is disclosed in a co-pending U.S. patent application entitled "SWITCHABLE INTERLEAVED CHANNEL SEPARATOR DEVICES AND SYSTEMS", Ser. No 09/772,684 filed on Jan. 30, 2001, which is assigned to the assignee of the present application and which is incorporated herein by reference in its entirety. Further, these non-linear interferometers 410a–410b are modified instances of an invention disclosed in U.S. Pat. No. 6,169,604, assigned to the assignee of the present application, which is incorporated herein by reference in its entirety.

Each of the adjustable non-linear interferometers 410a and 410b has the property such that, if the light beam reflected therefrom is composite optical transmission comprised of a plurality of wavelength division multiplexed channels and the light of each channel is linearly polarized, then the light of a first set of channels (for instance the "even" channels) is reflected with a 90° rotation of its polarization plane direction whilst the light of the remaining set of channels (for instance, the "odd" channels) is reflected with unchanged polarization. When light is input from the first input optical fiber 510 as shown in FIG. 5, the light comprising the set of channels whose polarization is rotated (the even channels, in this example) is directed to the second output optical fiber 530 and the light comprising the other set of channels (the odd channels, in this example) is directed to the first output optical fiber 520. When light is input from the second input optical fiber 540, the light comprising the set of channels whose polarization is rotated is directed to the first output optical fiber 520 and the light comprising the other set of channels is directed to the second output optical fiber 530.

It may be noted from the above description that, if fiber 510 is defined as Port A, fiber 520 is defined as Port B, fiber 540 is defined as Port C and fiber 530 is defined as Port C, then the device 400.1 functions as shown in the upper diagram of FIG. 4. Furthermore, each of the adjustable non-linear interferometers 410a–410b of the switchable interleaved channel separator device 400.1 comprises two mutually exclusive states, whereby the set of channels (either even or odd) whose polarization plane is rotated may be selected. It is assumed that the two adjustable non-linear interferometers 410a–410b are always both in the same state. Thus, by toggling both adjustable non-linear interferometers form their first to second states and vice versa by mechanisms discussed further below as well as in the aforementioned co-pending patent application Ser. No. 09/772,684, the output pathways of odd and even channels may be reversed. Thus, the device 400.1 can toggle between the two states shown in FIG. 4.

Figure 6:
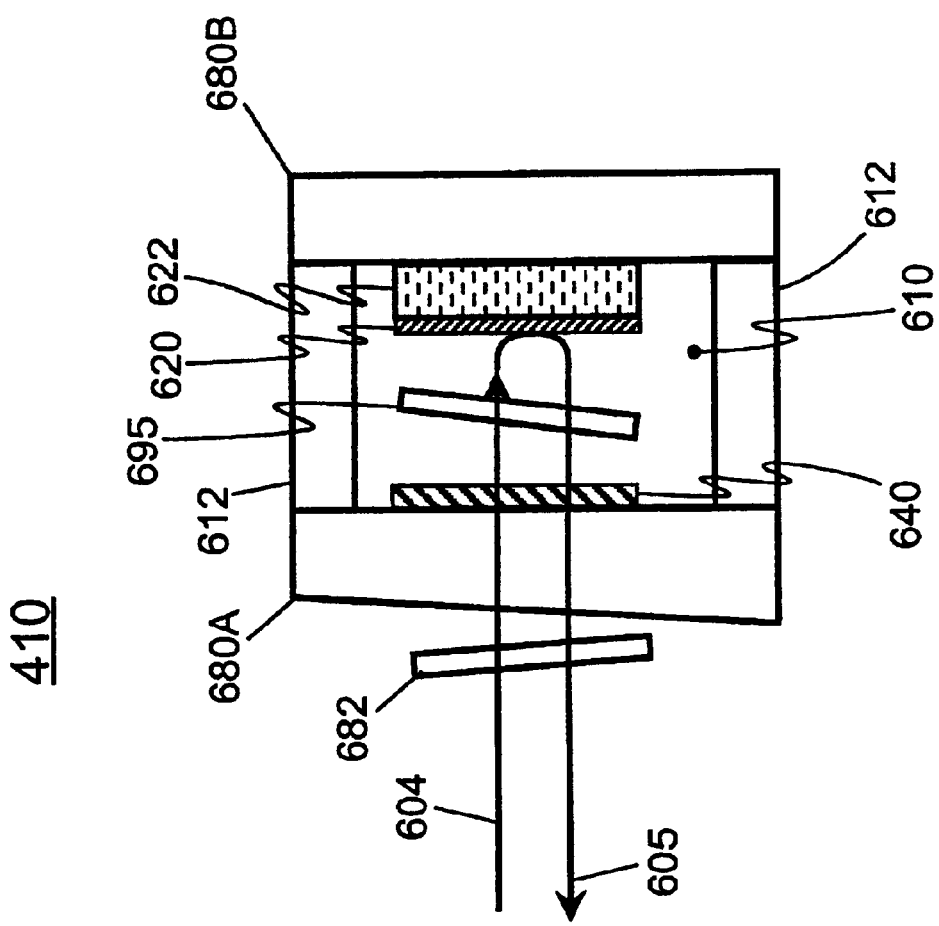
FIG. 6 illustrates a preferred embodiment of an adjustable non-linear interferometer that may be utilized within the switchable interleaved channel separator device shown in FIG. 5.

FIG. 6 illustrates a preferred embodiment of the construction of an adjustable nonlinear interferometer 410 that may be utilized within the switchable interleaved channel separator device 400.1 shown in FIG. 5, or within other switchable interleaved channel separator devices described subsequently in this specification. Other forms of construction of the adjustable non-linear interferometer are provided in the aforementioned co-pending U.S. patent application Ser. No. 09/772,684. The adjustable non-linear interferometer 410 (FIG. 6) comprises two plates 680A–680B optically coupled to one another, wherein the first plate 680A comprises glass with a wedge shape. A piezoelectric element 622 is attached to the second plate 680B and a reflective coating 620, preferably of approximately 100% reflectivity, is disposed upon the piezoelectric element 622 facing into the cavity 610. The inside face of the first glass plate 680A is substantially parallel to the coating-surface 620 and is coated with a layer of a partially reflective coating 640 with a reflectivity less than 100%. The two glass plates are separated by spacers 612, such that an interferometric cavity 610 is created between the partially reflective coating 640 and the 100% reflective coating 620. The spacers 612 preferably comprise a zero-thermal-expansion or low-thermal-expansion material. The adjustable non-linear interferometer 410 further comprises a first birefringent waveplate 682 disposed external to the cavity 610 and optically coupled to the glass plate 680A and a second birefringent waveplate 695 disposed within the cavity 610 and optically coupled to both optical coatings 640 and 622. An input linearly polarized light 604 comprised of multiple channels is reflected as light 605, wherein the polarization of a first set of channels is rotated and the polarization of a second set of channels interleaved with the first set of channels is not rotated.

As described in more detail in the aforementioned co-pending U.S. patent application having Ser. No. 09/388,350", the reflectivity, $r_1$, of the partially reflective coating 640 and the optical retardance (or retardation), $L_1$, of the external waveplate 682 and the optical retardance, $L_2$, of the internal waveplate 695, may be independently varied so as to vary the optical properties of the non-linear interferometer 410. Specifically, when $L_1=\lambda/8$, $L_2=\lambda/4$ and $r_1=18.5\%$, then the channels comprising the rotated polarization light and the set of channels comprising the non-rotated polarization light have similar spectral bandwidths. In another example, when $L_1=3\lambda/16$, $L_2=\lambda/8$ and $r_1=32.5\%$, then the channels comprising the rotated polarization light and the set of channels comprising the non-rotated polarization light have spectral bandwidths that are in a ratio of 3:1 (or 1:3). In yet another example, when $L_1=7\lambda/32$, $L_2=\lambda16$ and $r_1=56.3\%$, then the channels comprising the rotated polarization light and the set of channels comprising the non-rotated polarization light have spectral bandwidths that are in a ratio of 7:1. (or 1:7). In each case the first and second sets of channels are interleaved with one another.

Each of the adjustable non-linear interferometers 410 may be changed from a first operational state to a second operational state by adjusting the optical path length $L_0$ of the cavity 610. In a first operational state; upon reflection from the adjustable non-linear interferometer 410, the polarization of the light of a first set of channels is rotated by 90° whilst the polarization of the light of a second set of channels is not rotated. In a second operational state, the polarization of the light of the second set of channels is rotated by 90° whilst the polarization of the light of the first set of channels is not rotated.

In the version of the adjustable non-linear interferometer 410 shown in FIG. 6, the variable thickness of the piezoelectric element 622 may be very accurately controlled by controlling a voltage applied across the piezoelectric element 622. This property of piezoelectric materials is well known. In this fashion, the optical path length $L_0$ between the parallel reflective surfaces 620 and 640 may be controlled. In other versions of adjustable non-linear interferometer suitable for use within the present invention, the optical path length $L_0$ between the parallel reflective surfaces 620 and 640 may be controlled by adjusting the "tilt" angle of the internal waveplate 695 or by exposing the cavity elements to a variable air pressure. These alternative constructions for the adjustable non-linear interferometer are disclosed in more detail in the aforementioned co-pending U.S. patent application having Ser. No. 09/772,684.

Figure 7:
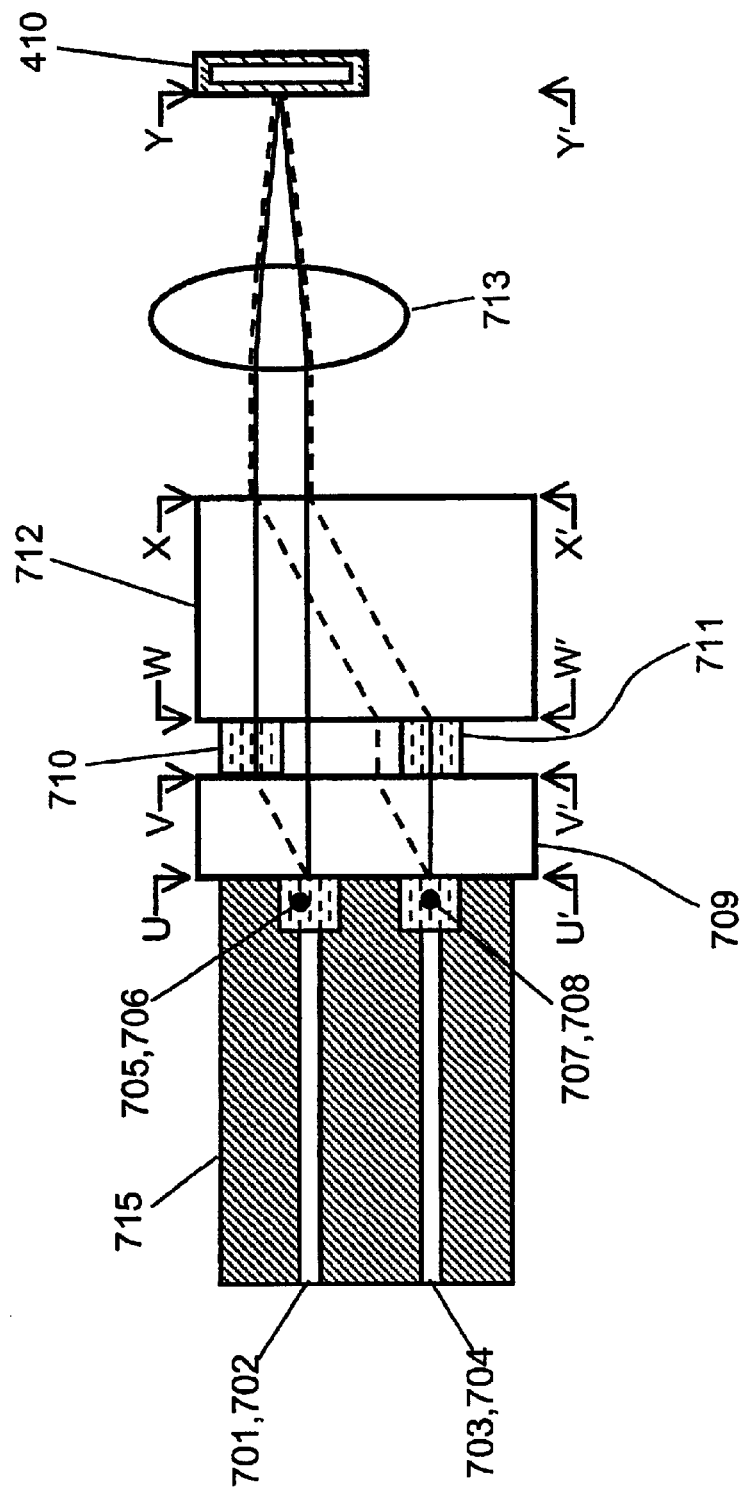
FIG. 7 illustrates a second preferred embodiment of a 2×2 switchable interleaved channel separator device that may be used within the full-duplex optical communications system in accordance with the present invention.

FIG. 7 illustrates a second preferred embodiment of a 2×2 switchable interleaved channel separator device that may be utilized within the full-duplex optical communications systems in accordance with the present invention. The switchable interleaved channel separator device 400.2, shown in FIG. 7, is a modified version of a device disclosed in a co-pending U.S. patent application entitled "High-Isolation Dense Wavelength Division Multiplexer Utilizing Birefringent Plates and a Non-Linear Interferometer", Ser. No. 09/404,005, filed Sep. 23, 999, which is assigned to the assignee of the present application and which is incorporated herein by reference in its entirety. In the device 400.2, reference numeral 715 is a four fiber ferrule and reference numerals 701, 702, 703 and 704 are four optical fibers, Fiber A, Fiber B, Fiber C and Fiber D, respectively, contained within and securely bonded to ferrule 715. Four collimator lenses, reference numerals 705, 706, 707 and 708, are incorporated into the end of ferrule 715 such that each collimator receives tight from and directs light to exactly one of the fibers, specifically Fiber A 701, B 702, C 703 and D 704, respectively.

Disposed adjacent to the end of ferrule 715 is a first birefringent walk-off plate 709 that has the property of separating any channel light ray emanating from any of the fibers 701, 702, 703 or 704 into two physically separated linearly polarized sub-signal rays-ne innermost and one outermost sub-signal ray. Because four fibers are contained within ferrule 715, eight separate sub-signals are so defined and are comprised of four outermost and four innermost sub-signals. The outermost and innermost sub-signals from both Fiber A 701 and Fiber B 702 comprise e-rays and o-rays, respectively, in their traverse through birefringent plate 709. Conversely, the outermost and innermost sub-signals from both Fiber C 703 and Fiber D 704 comprise o-rays and e-rays, respectively, in their traverse through birefringent plate 709. In this specification, the polarization plane directions of e-rays and o-rays are arbitrarily referred to as "vertical" and "horizontal," respectively.

Disposed adjacent to the first birefringent plate 709 and on the side of plate 709 opposite to ferrule 715 are both a first half-wave plate 710 and a second half-wave plate 711. Half-wave plate 710 is aligned so as to intercept only the two outermost sub-signals arising from Fiber A 701 and Fiber B 702. Likewise, half-wave plate 711 is aligned so as to intercept only the two outermost sub-signals arising from Fiber C 703 and Fiber D 704. A second birefringent walk-off plate 712 is disposed adjacent to the two half-wave plates 710 and 711 on the side opposite to the first birefringent plate 709. The thickness of birefringent plate 712 is designed so as to give an offset of one of the rays propagating therethrough equivalent to the center-to-center distance between a pair of fibers. A lens or lens assembly 713 is disposed to the side of the second birefringent walk-off plate 712 opposite to the half wave plates 710 and 711. Finally, an adjustable non-linear interferoineter 410, similar to each of the adjustable non-linear interferometers 410a–410b shown in FIG. 5, is disposed at the focal point of lens 713 opposite to the birefringent plate 712.

Further details of the operation of the device 400.2 are provided in the aforementioned co-pending U.S. patent application with Ser. No. 09/404,005. The switchable interleaved channel separator device 400.2 of the present invention is modified from that disclosed in the co-pending patent application through the provision of the adjustable non-linear interferometer 410, which allows the device to function as a 2×2 switch as illustrated in FIG. 4.

Figure 8A:
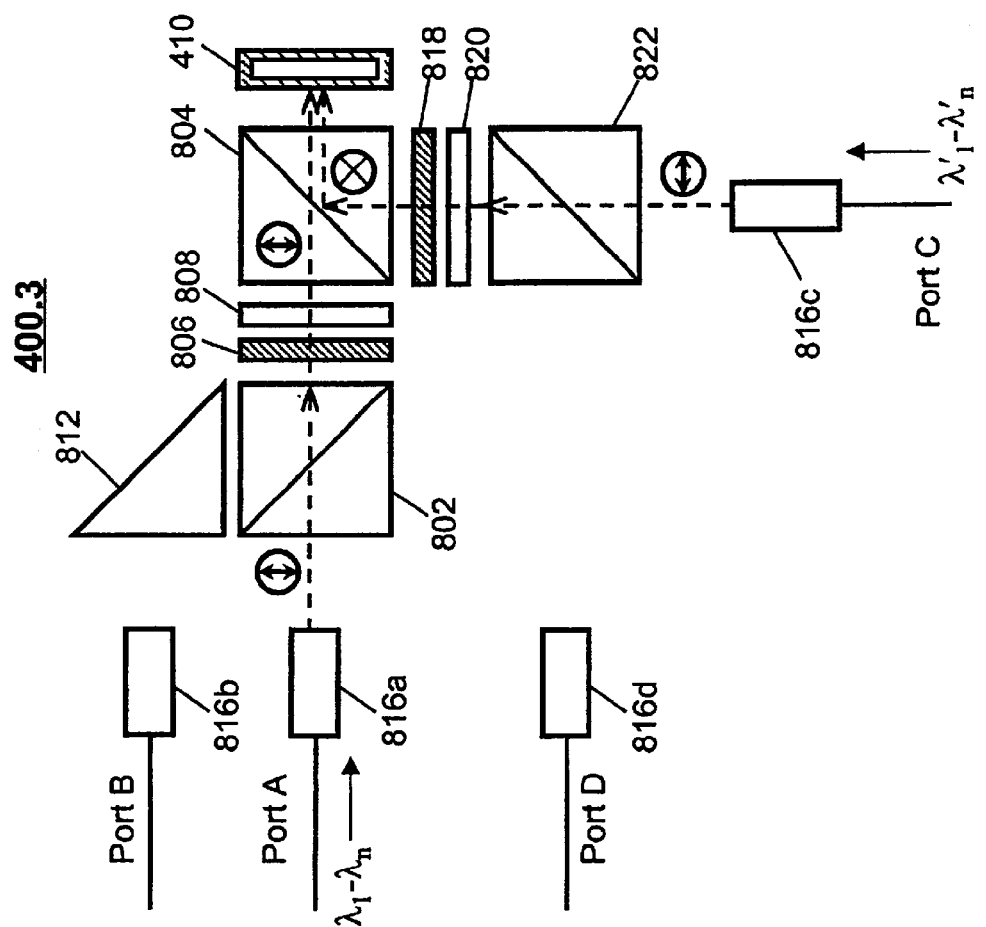
FIGS. 8a and 8b illustrate a third preferred embodiment of a 2×2 switchable interleaved channel separator device that may be used within the full-duplex optical communications system in accordance with the present invention.
Figure 8B:
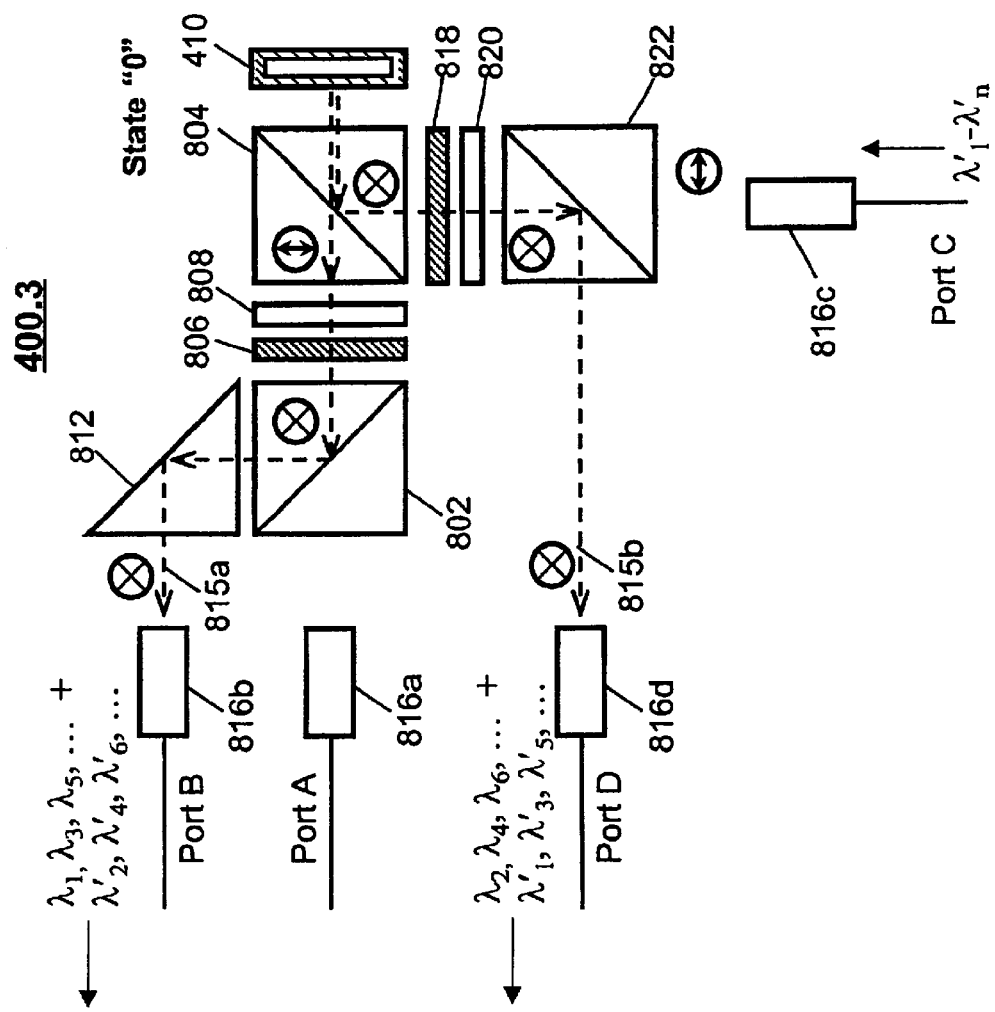

FIGS. 8a–8b illustrate a third preferred embodiment of a 2×2 switchable interleaved channel separator device that may be utilized within the full-duplex optical communications, systems in accordance with the present invention. The switchable interleaved channel separator device 400.3, shown in FIGS. 8a–8b, is a modified version of a device disclosed in a co-pending U.S. patent application entitled "Multi-Functional Optical Device Utilizing Multiple Polarization Beam Splitters and Non-Linear Interferometers," Ser. No. 09/630,891, filed on Aug. 2, 2000, which is assigned to the assignee of the present application and which is incorporated herein by reference in its entirety. The 2×2 switchable interleaved channel separator device 400.3 (FIGS. 8a–8b) receives input from a first input optical port, Port A 816a, and separates the channels therein into a first set of channels and a second set of channels that are interleaved with the first set of channels, wherein the first set is output to a first output optical port, Port B 816b, and the second set is output to a second output optical port, Port D 816d, respectively. Furthermore, the 2×2 switchable interleaved channel separator device 400.3 receives input from a second optical port, Port C 816c, and separates the channels therein into a third set of channels and a fourth set of channels that are interleaved with the third set of channels, wherein the third set is output to the second output optical port, Port D 816d, and the fourth set is output to the first output optical port, Port B 816b, respectively. For reasons further detailed below, the optical ports 816a–816d are also referred to herein as polarizing ports.

As shown in FIGS. 8a–8b, in addition to the four polarizing ports, the 2×2 switchable interleaved channel separator 400.3 comprises a first 802 and a second 804 polarization beam splitter (PBS) between which are disposed a first non-reciprocal optical rotator 806 and a first reciprocal optical rotator 808. The two PBS's 802-804 each have the property of transmitting channel light comprising a first polarization (p-polarization) therethrough along the main axis whilst simultaneously deflecting channel light comprising a second polarization (s-polarization). The first PBS 802 receives optical input from the input port 816a which is disposed adjacent to a side of the PBS 802 opposite to the non-reciprocal rotator 806 and reciprocal rotator 808. An adjustable non-linear interferometer 410 is disposed adjacent to the second PBS 804 at a side opposite to the non-reciprocal rotator 806 and reciprocal rotator 808. The input port 816a, first PBS 802, second PBS 804, non-reciprocal rotator 806, reciprocal rotator 808 and adjustable non-linear interferometer 410 are disposed along a line which defines a main axis or dimension of the switchable interleaved channel separator 400.3.

The 2×2 switchable interleaved channel separator device 400.3 (FIGS. 8a–8b) further comprises a third PBS 822 disposed between the second PBS and the second input port 816c, a second non-reciprocal optical rotator 818 and a second reciprocal optical rotator 820 disposed between the third PBS 822 and the second PBS 804, and an optical reflector 812 disposed adjacent to a face of the first PBS 802 that does not intersect the main axis of the device. The optical reflector 812 shown in FIGS. 8a–8b preferably comprises a right-angle prism, but could also comprise a mirror. Finally, the first output port 816b and the second output port 816d are disposed such that they receive light deflected by the optical reflector 812 and by the third PBS 822, respectively.

The non-reciprocal optical rotators 806 and 818 preferably comprise Faraday rotators, which are well-known in the art. These Faraday rotators are typically comprised of a ferromagnetic oxide crystal, such as yttrium iron garnet (YIG) or else of a diamagnetic glass with a high lead oxide content, or a paramagnetic glass on cubic crystal containing various ions such as trivalent cerium or terbium. Each pair of optical rotators 806–808 and 818–820 is configured so as to rotate by 90° the polarization plane of linearly polarized light passing completely therethrough in a first direction while not rotating the polarization plane of such light passing therethrough in the opposite direction. One of ordinary skill in the art will know several alternative means of configuring each pair of rotators so as to provide this property.

Also shown in FIGS. 8a–8b, as well as in several following figures of this specification, are the polarization orientations of various channel light rays. These polarization orientations are indicated by double barbed arrows and/or crosses inscribed within circles. Unless otherwise indicated, double barbed arrows indicate light polarization along the indicated direction within the plane of the illustration, and crosses indicate light polarization normal to the plane of the page. Superimposed arrows and crosses either indicate non-polarized or randomly polarized light or superimposed rays which, in projection, have mutually perpendicular polarization plane orientations.

FIG. 9 illustrates a polarizing port 816, which is utilized within the switchable interleaved channel separator device 400.3 in FIGS. 8a–8b. The port 816 is herein termed a "polarizing port" because the port outputs light comprising only a single linear polarization orientation and can only receive light comprising the same linear polarization orientation. The polarizing port 816 is also suitable for use within the fourth preferred embodiment of the 2×2 switchable interleaved channel separator device 400.4 (FIGS. 10a–10c) described subsequently in reference to those figures.

The polarizing port 816 (FIG. 9) comprises an optical fiber 880, an optical collimator 882, a birefringent walk-off plate 884 and a reciprocal optical rotator 886. The optical collimator 882 is optically coupled to the optical fiber 880 and either receives input from or directs output to the fiber 880. The birefringent walk-off plate 884 of the polarizing port 816 (FIG. 9) is optically coupled to the collimator 882 at a side opposite to the fiber 880 and has the property of physically separating an unpolarized light beam received from collimator 882 into a deflected light beam 890 and an un-deflected light beam 888. The deflected light 890 comprises an e-ray having a first linear polarization orientation and the un-deflected light 888 comprises an o-ray having a second linear polarization orientation perpendicular to that of the e-ray. The reciprocal optical rotator 886, which is optically coupled to the birefringent walk-off plate 884 at a side opposite to the collimator 882, is disposed so at to intercept the path of only one of the two beams 888–890. The reciprocal optical rotator 886 rotates the polarization orientation of the intercepted beam by 90° so as to be parallel to that of the other beam. In the reverse light propagation direction, that is, when the polarizing port 816 is utilized as an output port, the optical rotator 886 rotates the polarization orientation of only one of two beans so that the beams subsequently comprise mutually orthogonal polarization orientations and such that these two beams are subsequently combined upon passage through the birefringent walk-off plate 884. The reciprocal optical rotator 886 may be disposed so as to intercept either the o-ray 888 or the e-ray 890.

The pathways and polarization orientations of forward propagating input channel rays (that is, rays propagating from the two input ports until reflection from and interaction with the adjustable non-linear interferometer 410) within the switchable interleaved channel separator device 400.3 are shown in FIG. 8a. The return pathways of the combined first and fourth sets of channels 815a and of the combined second and third sets of channels 815b through the switchable interleaved channel separator device 400.3 are respectively shown in FIG. 8b.

Explicit details of the operation of the 2×2 switchable interleaved channel separator device 400.3 are provided in the aforementioned co-pending U.S. patent application having Ser. No. 09/630,891. In summary, light of a composite optical transmission; which is comprised of a plurality of wavelength division multiplexed channels $\lambda_1-\lambda_n$, is input to the device 400.3 from input the first input port 816a (FIG. 8a) with a linear polarization orientation. Light of a second composite optical transmission, which is comprised of a second plurality of wavelength division multiplexed channels $\lambda'_1-\lambda'_n$, is input to the device 400.3 from the second input port 816c (FIG. 8a) with a linear polarization orientation. The forward-propagating channels $\lambda_1-\lambda_n$ and $\lambda'_1-\lambda'_n$ arrive at the adjustable non-linear interferometer 410 with vertical polarization and horizontal polarization, respectively.

After being input to the device 400.3, the channels $\lambda_1-\lambda_n$ and the channels $\lambda'_1-\lambda'_n$ propagate through the device 400.3 to the adjustable non-linear interferometer 410 (FIG. 8a). The adjustable non-linear interferometer 410 reflects the channel light such that the polarization plane of one set of channels is rotated by 90° whilst that of a second set of channels interleaved with the first set is not rotated. In FIGS. 8a–8b, it is assumed that the polarization plane of light comprising the even channels is rotated. However, the adjustable non-linear interferometer 410 can operate in either one of two states so as to select the particular set of channels whose light incurs polarization rotation. The light of the reflected channels then returns through the device 400.3 such that the light comprising the various channels is separated according to its polarization orientation. The polarization orientations and pathways of the channels through the device 400.3 may be traced out using FIGS. 8a–8b so as to verify that the device 400.3 operates according to the scheme shown in FIG. 4. It is to be noted that, during passage from right-to-left through the pair of elements 806–808, the polarization plane orientation of linearly polarized light is rotated by 90°, but, during passage from left-to-right through the pair of elements 806–808, the polarization plane orientation is not rotated. Likewise, the polarization plane orientation of linearly polarized light is rotated by 90° during bottom-to-top passage of light through the pair of rotator elements 818–820 but is not rotated during top to bottom passage through the pair of elements 818–820.

Figure 10A:
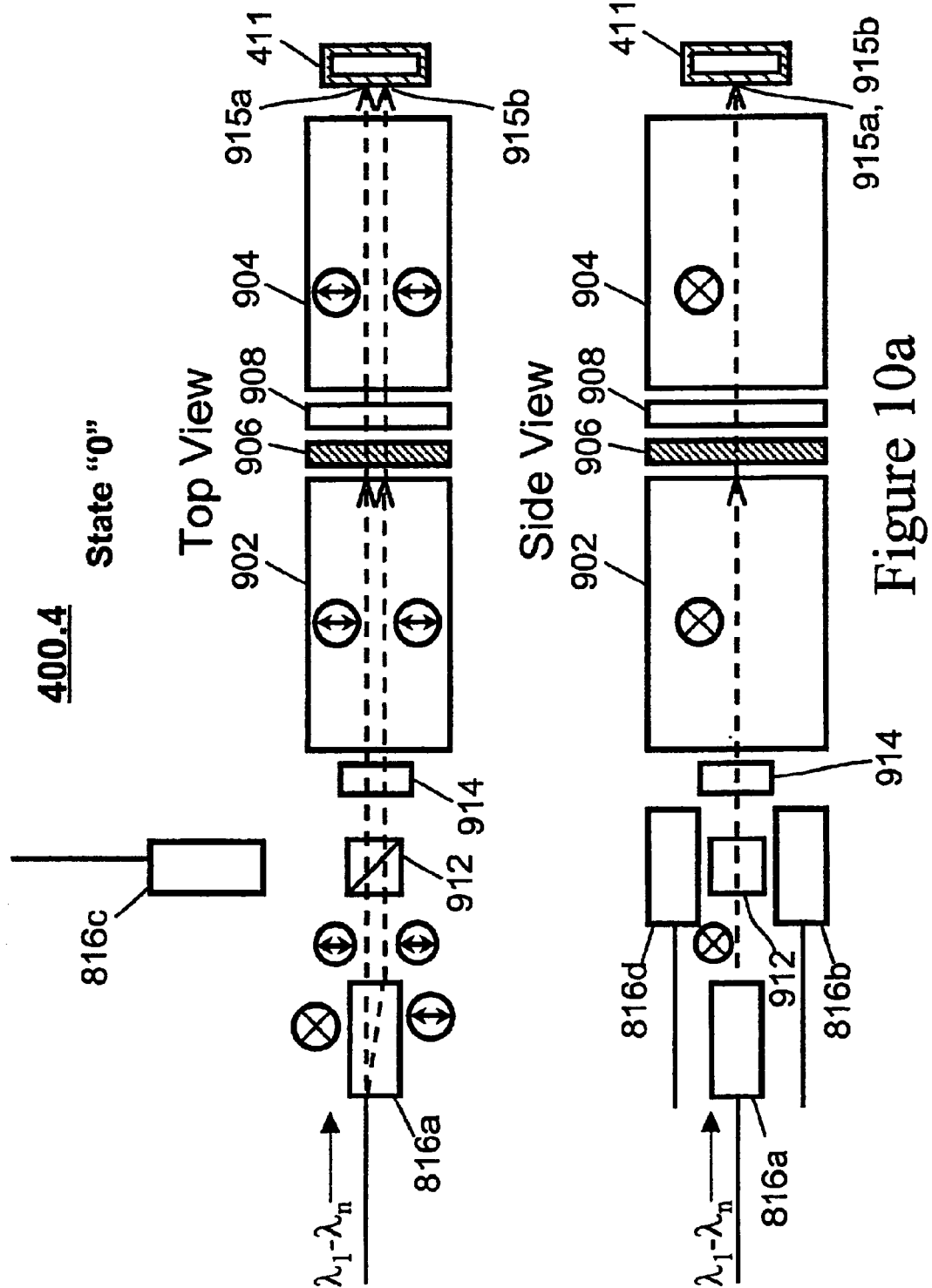
FIGS. 10a–10c illustrate a fourth preferred embodiment of a 2×2 switchable interleaved channel separator device that may be used within a full-duplex optical communications system in accordance with the present invention.
Figure 10B:
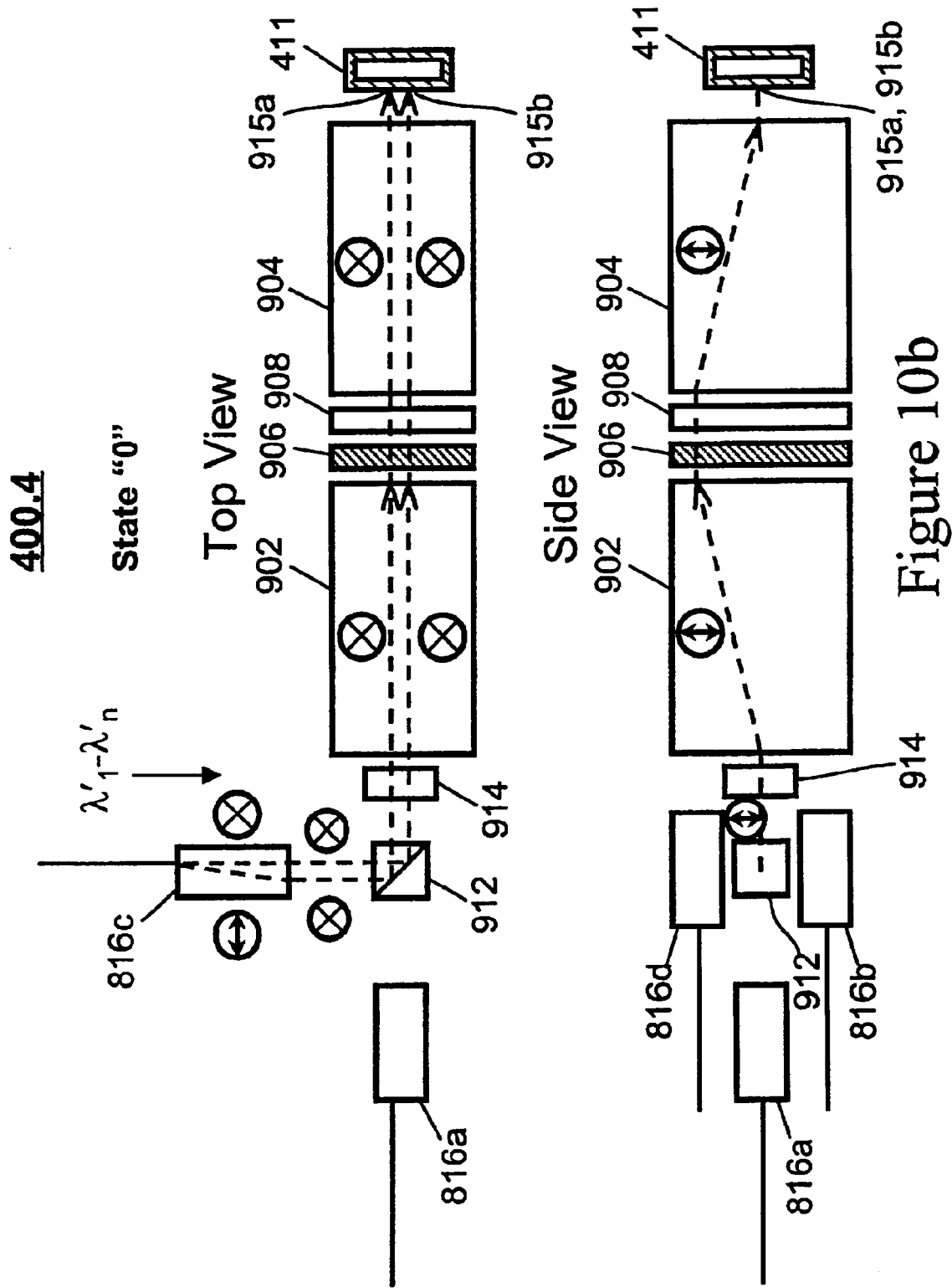
Figure 10C:
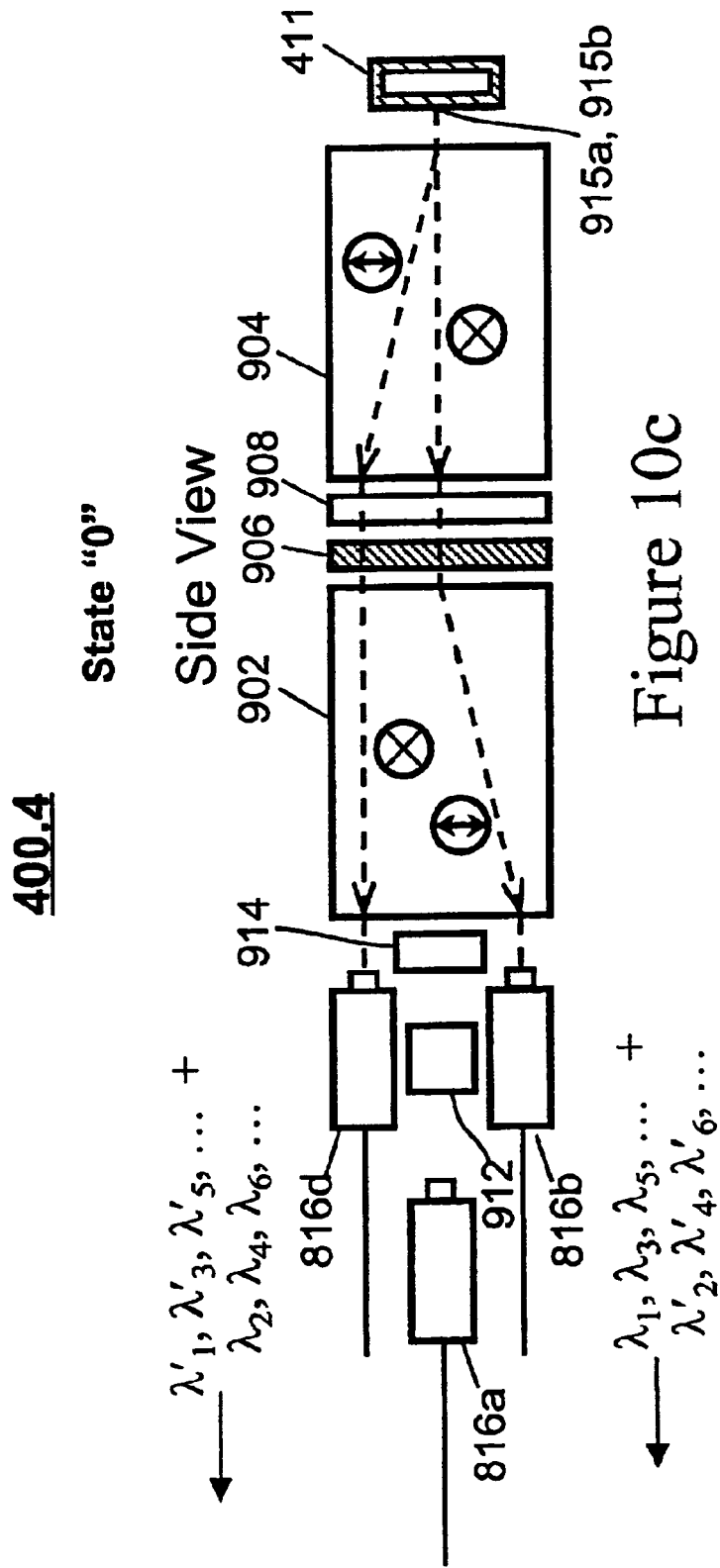

FIGS. 10a–10c illustrate a fourth preferred embodiment of a 2×2 switchable interleaved channel separator device that may be utilized within the full-duplex optical communications systems in accordance with the present invention. The switchable interleaved channel separator device 400.4, shown in FIGS. 10a–10c, is disclosed in a co-pending U.S. patent application entitled "Switchable Interleaved Optical Channel Separator and Isolator Device and Optical Systems Utilizing Same", Ser. No. 09/792,231, filed on Feb 23, 2001 which is assigned to the assignee of the present application and which is incorporated herein by reference in its entirety. The forward pathways of channels through the 2×2 switchable interleaved channel separator 400.4 are illustrated in both top and side views in FIGS. 10a–10b. The return pathways of channels through the device 400.4 are shown in side view FIG. 10c.

In operation, the 2×2 switchable interleaved channel separator device 400.4 receives a first composite optical transmission, $\lambda_1$–$\lambda_n$, from a first input optical port 816a (FIG. 10a) and receives a second composite optical transmission, $\lambda'_1$–$\lambda'_n$, from a second input optical port 816c (FIG. 10b). The device 400.4 then separates the channels received from the first optical port 816a into a first set of channels (i.e., "odd" channels $\lambda_1, \lambda_3, \lambda_5, \ldots$) and a second set of channels (i.e., "even" channels $\lambda_2, \lambda_4, \lambda_6, \ldots$) that are interleaved with the first set of channels, and separates the channels received from the second optical port 816c into a third set of channels (i.e., "odd" channels $\lambda'_1, \lambda'_3, \lambda'_5, \ldots$) and a fourth set of channels (i.e., "even" channels $\lambda'_2, \lambda'_4, \lambda'_6, \ldots$) that are interleaved with the third set of channels. In the switch state "0", the first set of channels and the fourth set of channels are output to a first output optical port 816b (FIG. 10c) whilst the second set channels and the third set of channels are output to a second output optical port 816d (FIG. 10c). In the second switch state "1", the second set of channels and the third set of channels are output to the first output optical port 816b whilst the first set channels and the fourth set of channels are output to the second output optical port 816d. This operation follows the scheme shown in FIG. 4.

As shown in FIGS. 10a–10c, the switchable interleaved channel separator device 400.4 comprises four polarizing ports 816a–816d of the type shown in FIG. 9, a polarization beam splitter (PBS) 912 optically coupled to the two input ports 816a and 816c, a switchable optical rotator 914 optically coupled to the PBS 912, a first 902 birefringent walk-off plate (or, simply termed, "birefringent plate") optically coupled to the two output ports 816b and 816d and to the switchable optical rotator 914, a second birefringent plate 904, a non-reciprocal optical rotator 906 and a reciprocal optical rotator 908 disposed between and optically coupled to the first 902 and second 904 birefringent plates, and a non-linear interferometer 411 optically coupled to the second birefringent plate 904. The nonlinear interferometer 411, which is not adjustable in the device 400.4, is disclosed in the aforementioned co-pending U.S. patent application having Ser. No. 09/388,350, as well as in the U.S. Pat. No. 6,169,604. This patent, which is assigned to the assignee of the present application, is incorporated herein by reference in its entirety. The first-birefringent plate 902 receives optical input from the first input port 816a and the second input port 816c. The channels delivered to the device 400.4 from either of the input ports 816a, 816c pass through the PBS 912 and the switchable optical rotator 914 and then into the first birefringent plate 902. The first output port 816b and the second output port 816d are disposed above and below the input ports 816a and 816c and are optically coupled to the first birefringent plate 902.

The first input port 816a, PBS 912, switchable optical rotator 914, first birefringent plate 902, second birefringent plate 904, non-reciprocal rotator 906, reciprocal rotator 908 and non-linear interferometer 411 are disposed along a line which defines a main axis or dimension of the switchable interleaved channel separator device 400.4. The second input port 816c is at an angle to; but in the same plane as, this axis, as shown in FIGS. 10a–10c.

The two birefringent plates 902–904 (FIGS. 10a–10c) each have the property of transmitting channel light comprising a first polarization (o-ray) therethrough substantially parallel to the main axis whilst simultaneously causing a deflection or offset of a channel light comprising a second polarization (e-ray). The path of the e-ray is deflected within either birefringent plate but is substantially parallel to (thereby offset from) that of the o-ray immediately upon exiting the plate. The optical axes of the two birefringent plates 902–904 are disposed such that, for e-rays passing through both such birefringent plates 902–904 in a same direction, the offset of the e-ray immediately caused by passage through the second such birefringent plate 904 is equal and opposite to the offset of the e-ray immediately caused by the passage through the first birefringent plate 902. As oriented in FIGS. 10a–10c, the e-rays and o-rays are polarized vertically and horizontally, respectively, during their traverses through the birefringent plates 902–904.

In operation of the device 400.4, the light of a first WDM composite optical transmission, which is comprised of a plurality of wavelength division multiplexed channels $\lambda_1$–$\lambda_n$, is input to the PBS 912 from the first input port 816a (FIG. 10a) such that the two separated input beams both comprise p-polarized light with respect to the PBS 112. Alternatively or simultaneously, the light of a second WDM composite optical transmission, which is comprised of a plurality of wavelength division multiplexed channels $\lambda'_1$–$\lambda'_n$, is input to the PBS 912 from the second input port 816c (FIG. 10b) such that the two separated input beams both comprise s-polarized light with respect to the PBS 912. The p-polarized channels $\lambda_1$–$\lambda_n$ are transmitted directly through the PBS 912 and the s-polarized channels $\lambda'_1$–$\lambda'_n$ are reflected within the PBS 912 such that these two sets of channels are spatially combined and pass through the switchable optical rotator 914 (FIGS. 10a, 10b).

The switchable optical rotator 914 may comprise a liquid crystal rotator, a magneto-optic based Faraday rotator, an acousto-optic or electro-optic rotator, or some combination of these elements. It is assumed, within FIGS. 10a–10c, that the switchable interleaved channel separator 400.4 is in its first switch state, state "0". In this state, (FIGS. 10a–10b), the spatially overlapping sets of channels $\lambda_1$–$\lambda_8$ and $\lambda_1$–$\lambda_n$ pass through the switchable optical rotator 914 and into the first birefringent plate 902 without any change in their respective polarization orientations. Conversely, when the switchable interleaved channel separator device 400.4 is in its second configuration, state "1", the switchable optical rotator 914 rotates the polarization plane or orientations of the channels $\lambda_1$–$\lambda_n$ and $\lambda'_1$–$\lambda'_n$ 90°.

When the switchable interleaved channel separator 400.4 is in the state "0", the horizontally polarized channels $\lambda_1$–$\lambda_n$ comprise undeflected o-rays (FIG. 10a) and the vertically polarized channels $\lambda'_1$–$\lambda'_n$ comprise deflected e-rays (FIG. 10b) within the first birefringent plate 902. When the switchable interleaved channel separator device 400.4 is in its second state, state "1", which is not illustrated in the drawings, the polarizations of the channels are rotated by 90° by the switchable optical rotator 114 and thus the $\lambda_1$–$\lambda_n$ channels pass through the birefringent plate 902 as deflected e-rays and the $\lambda'_1$–$\lambda'_n$ channels pass through the birefringent plate 902 as undeflected o-rays.

After emerging from the first birefringent plate 902, channels $\lambda_1$–$\lambda_n$ and $\lambda'_1$–$\lambda'_n$ pass through the non-reciprocal optical rotator 906, the reciprocal optical rotator 908 and the second birefringent plate 904. The elements 906–908 are disposed such that light passing through both from left to right does not experience polarization plane rotation. Thus, when the switchable interleaved channel separator device 400.4 is in state "0", the channels $\lambda_1$–$\lambda_n$ and $\lambda'_1$–$\lambda'_n$ respectively propagate through the second birefringent plate 904 as an undeflected o-ray (FIG. 10a) and as a deflected e-ray (FIG. 10b). In either switch state, the $\lambda_1$–$\lambda_n$ and $\lambda'_1$–$\lambda'_n$ channels all arrive at the points 915a–915b on the non-linear interferometer 411.

FIG. 10c illustrates the return pathways of the odd channels $\lambda_1$, $\lambda_3$, $\lambda_5$, . . . and the even channels $\lambda'_2$, $\lambda'_4$, $\lambda'_6$, . . . 400.4 to the first output port 816b and the return pathways of the even channels $\lambda_2$, $\lambda_4$, $\lambda_6$, . . . and the odd channels $\lambda'_1$, $\lambda'_3$, $\lambda'_5$, . . . to the second output port 816d through the switchable interleaved channel separator 400.4 in the state "0". In the alternative switch state "1", the polarizations and the pathways of the channels are reversed from those in the state "0", and thus, the odd channels $\lambda_1$, $\lambda_3$, $\lambda_5$, . . . and the even channels $\lambda'_2$, $\lambda'_4$, $\lambda'_6$, . . . are directed to the second output port 816d and the even channels $\lambda_2$, $\lambda_4$, $\lambda_6$, . . . and the odd channels $\lambda'_1$, $\lambda'_3$, $\lambda'_5$, are directed to the first output port 816b.

As illustrated in FIG. 10c for the state "0", the light of the reflected odd channels, $\lambda_1$, $\lambda_3$, $\lambda_5$, . . . , whose polarization is not rotated by the non-linear interferometer 411, remains horizontally polarized upon re-entering the second birefringent plate 904. Further, the light of the reflected even channels, $\lambda'_2$, $\lambda'_4$ $\lambda'_6$, . . . , whose polarization is rotated by 90° by the non-linear interferometer 411, is also horizontally polarized upon re-entering the second birefringent plate 904. As a result, the light of the channels $\lambda_1$, $\lambda_3$, $\lambda_5$, . . . and of the channels $\lambda'_2$, $\lambda'_4$, $\lambda'_6$, . . . comprises o-rays with respect to the second birefringent plate 904 and passes directly through the second birefringent plate 904 without deflection towards the reciprocal optical rotator 908 and the non-reciprocal optical rotator 906. Contrariwise, the light of the reflected channels $\lambda_2$, $\lambda_4$, $\lambda_6$, . . . , whose polarization plane is rotated by 90° upon reflection from non-linear interferometer 411, and the light of the reflected channels $\lambda'_1$, $\lambda'_3$, $\lambda'_5$, . . . , whose polarization is not rotated upon reflection from non-linear interferometer 411, comprises e-rays with respect to the second birefringent plate 904 and therefore is deflected within the second birefringent plate 904.

During passage from right-to-left through the pair of elements 906–908, the polarization plane orientation of light is rotated by 90°. In the state "0", therefore, the light of the channels $\lambda_1$, $\lambda_3$, $\lambda_5$, . . . and of the channels $\lambda'_2$, $\lambda'_4$, $\lambda'_6$, . . . becomes polarized as e-rays within the first birefringent plate 902 and the light of the channels $\lambda'_1$, $\lambda'_3$, $\lambda'_5$, . . . and of the channels $\lambda_2$, $\lambda_4$, $\lambda_6$, . . . becomes polarized as o-rays within the first birefringent plate 902 (FIG. 10c). The first birefringent plate 902 therefore deflects the light comprising the channels $\lambda_2$, $\lambda_4$, $\lambda_5$, . . . and $\lambda'_2$, $\lambda'_4$, $\lambda'_6$, . . . but allows the light comprising the channels $\lambda'_1$, $\lambda'_3$, $\lambda'_5$, . . . (FIG. 10c) to pass directly therethrough without deflection.

The optic axes of the two birefringent plates 902–904 are symmetrically oriented with respect to one another about a vertical plane perpendicular to the axis of device 400.4. Because of this disposition of the two optic axes, the offsets of channels polarized as e-rays in birefringent plate 902 and of channels polarized as e-rays in birefringent plate 904 are opposite to one another as illustrated in FIG. 10c.

The full duplex optical communications system disclosed in the present invention preferably comprises one of the switchable interleaved channel separator devices 400.1–400.4 illustrated herein. However, other known devices may be used for the components 400a–400b within the OADM 300 (FIGS. 3a–3b). With appropriate constructions, such devices may perform the switching functions illustrated in FIG. 4. For instance, one or more of the components 400a–400b may comprise a conventional Mach-Zehnder interferometer. Such a Mach-Zehnder interferometer may be manufactured from bulk optical components, may be manufactured from fused optical fibers (i.e., a "fiber Mach-Zehnder") or may be manufactured within a planar lightwave circuit. Switching of such a Mach-Zehnder interferometer may be accomplished by altering the optical path length difference of the two interferometric arms by, for instance, changing the temperature of one of the arms. One of ordinary skill in the art will readily understand how to construct a Mach-Zehnder interferometer and how to perform switching functions with such a device. Alternatively, a programmable wavelength router or a switchable wavelength router of known type may be used for one of the components 400a–400b.

An improved full-duplex optical communications system has been disclosed. The system in accordance with the present invention comprises a central office which provides a plurality of wavelength-division multiplexed lights to the system. The wavelength-division multiplexed lights provided by the central office comprise a plurality of signal channels and a plurality of continuous-wave (CW) channels. The system further comprises a plurality of nodes, wherein an optical add/drop multiplexer (OADM) at each node couples the network to customer or subscriber premises. The OADM at each node drops both a signal channel and a continuous-wave channel to the customer premises coupled to the respective node. The CW channel is modulated at the customer premises so that information may be returned from the customer premises via the modulated channel to a central office. The OADM comprising each node comprises an interconnected plurality of 2×2 interleaved channel separator devices and performs the functions of dropping a first channel comprising a signal channel and a second channel comprising a CW channel from an optical communications line to a customer or subscriber premises and of returning the second channel to the optical communication line from the customer or subscriber premises. The second channel is modulated at the customer or subscriber premises with information to be returned to a central office through the optical communications line. The OADM at each node may be either static or switchable.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A full-duplex optical communications system, comprising:
   at least one office, wherein the at least one office provides a plurality of channels, the plurality of channels comprising a plurality of signal channels and a plurality of continuous wave (CW) channels;
   at least one optical add/drop multiplexer (OADM) optically coupled to the at least one office, the OADM including:
      a first switchable interleaved channel separator device having:
         a first input port,
         a second input port,
         a first output port, and
         a second output port, and
      a second switchable interleaved channel separator device having:
         a first input port optically coupled to the second output port of the first switchable interleaved channel separator device,
         a second input port,
         a first output port optically coupled to the second input port of the first switchable interleaved channel separator device, and
         a second output port,
      wherein the first and second switchable interleaved channel separator devices each further comprises a separating means optically coupled to the first and second input ports of the first or second switchable interleaved channel separator device,
      wherein the separating means separates a first composite optical signal from the first input port of the first or second switchable interleaved channel separator device into a first set of channels and a second set of channels interleaved with the first set of channels,
      wherein the separating means separates a second composite optical signal from the second input port of the first or second switchable interleaved channel separator device into a third set of channels and a fourth set of channels interleaved with third set of channels, and
      wherein in a first state, the first output port of the first or second switchable interleaved channel separator device outputs the first and fourth sets of channels, and the second output port of the first or second switchable interleaved channel separator device outputs the second and third sets of channels, and
      wherein a second state, the first output port of the first or second switchable interleaved channel separator device outputs the second and third sets of channels, and the second output ort of the first or second switchable interleaved channel separator device outputs the first and fourth sets of channels; and
   a subscriber premise optically coupled to the at least one OADM, wherein at least one of the plurality of signal channels and at least one of the plurality of CW channels are dropped from the plurality of channels to the subscriber premises by the at least one OADM, wherein the subscriber premises modulates the dropped at least one of the plurality of CW channels, wherein in the modulated at least one of the plurality of CW channels is added to the plurality of channels by the at least one OADM.

2. The system of claim 1, wherein the separator means of the first or the second switchable interleaved channel separator device comprises:
   a first PBS optically coupled to the first input port of the first or the second switchable interleaved channel separator device;
   a first set of optical rotators optically coupled to the first PBS at a face intersecting a main axis of the first or second switchable interleaved channels separator device, the first set of optical rotators comprising a first non-reciprocal optical rotator and a first reciprocal optical rotator;
   a second PBS optically couple to the first set of optical rotators at a side opposite to the first PBS;
   an adjustable interferometer optically coupled to the second PBS at a side opposite to the first set of rotators;
   a second set of optical rotators optically coupled to the second PBS at a face not intersecting the main axis, the second set of optical rotators comprising a second non reciprocal optical rotator and a second reciprocal optical rotator,
   a third PBS optically coupled to the second set of optical rotators at a face opposite to the second PBS, wherein the third PBS is optically coupled to the second input port of the first or second switchable interleaved channel separator device at a face opposite to the second set of optical rotators, wherein the third PBS is optically coupled to the second output port of the first or the second switchable interleaved channels separator device at a face not opposite to the second set of optical rotators; and
   an optical reflector optically coupled to the first PBS at a face not intersecting the main axis, wherein the optical reflector is optically coupled to the first output port of the first or the second switchable interleaved channel separator device.

3. The system of claim 2, wherein the first or second input port of the first or the second switchable interleaved channel separator device, or the first or second output port of the first or the second switchable interleaved channel separator device, comprises:
   an optical collimator;
   a birefringent walk-off plate optically coupled to the optical collimator; and
   an input reciprocal optical rotator intercepting a portion of a light from the birefringent walk-off plate.

4. The system of claim 1, wherein the first or the second switchable interleaved channel separator device comprises:
   the separating means, wherein the separating means comprises a polarization beam splitter (PBS) optically coupled to the first and the second input ports of the first and second switchable interleaved channel separator devices, wherein the PBS separates the first composite optical signal from the first input port of the first or second switchable interleaved channel separator device into the first set of channels and the second set of channels interleaved with the first set of channels, wherein the PBS separates the second composite optical signal from the second input port of the first or second switchable interleaved channel separator device into the third set of channels and fourth set of channels interleaved with the third set of channels;

a first adjustable interferometer (AI) optically coupled to the PBS at a face opposite to the second input port of the first or the second switchable interleaved channel separator device, and a second AI optically coupled to the PBS at a face opposite to the first output port of the first or the second switchable interleaved channel separator device, wherein the first and the second AI in a first state rotates a polarization of the first and the third sets of channels, and wherein the first and the second AI in a second state rotates a polarization of the second and fourth sets of channels.

5. The system of claim 4, wherein the first or the second AI each comprises:

a first glass plate optically coupled to a second plate, forming a cavity and on the first glass plate, a piezoelectric element residing inside the cavity and coupled to the second plate, wherein a thick of the piezoelectric element is adjustable, wherein the thickness determines whether the first or the second AI is the first state or the second state;

a second reflective coating with a second reflectivity residing outside the cavity and optically coupled to the first glass plate; and a second waveplate with a second optical retardance residing inside the cavity and optically coupled to the first and second reflective coatings, wherein a combination of values for the first reflectively, the first optical retardance, and the second optical retardance affects spectral bandwidths for the first, second, third, fourth sets of channels.

6. The system of claim 1, wherein the first or the second switchable interleaved channel separator device comprises:

the separating means, wherein the separating means comprises:
a first birefringent plate,
a first and second half-wave plates, each partially optically coupled to the first birefringent plate, such that the first and second half-wave plates each is capable of intercepting approximately one-half wave plates on a side opposite to the first birefringent plate;
a lens optically coupled to the second birefringent plate on a side opposite to the first and second half-wave plates; mid
an AI optically coupled to the lens and disposed at a distance equal to the focal length of the lens on a side opposite to the second birefringent plate, wherein the AI in a first state rotates a polarization of the first and third sets of channels, and wherein the AI in a second state rotates a polarization of the second and fourth sets of channels.

7. The system of claim 1, wherein the first or the second switchable interleaved channel separator device comprises:

a PBS optically coupled to the first or the second input port of the first or the second switchable interleaved channel separator device;

the separating means, wherein the separating means comprises:
a first birefringent plate optically coupled to the PBS,
a set of optical rotators optically coupled to the first birefringent plate, the set of optical rotators comprising a NRR and a RR, a second birefringent plate optically coupled to the set of optical rotators at a side opposite to the first birefringent plate, and an interferometer optically coupled to the second birefringent plate at a side opposite to the set of optical rotators; and a switchable optical rotator (SOR) optically coupled to the PBS and the first birefringent plate, wherein the SOR in a first state does not rotate a polarization of the first, second, third, or fourth set of channels, wherein the SOR in a second state rotates a polarization of the first, second, third, and fourth set of channels.

8. A full-duplex optical communications system, comprising:

at least one office, wherein the at least one office provides a plurality of channels, the plurality of channels comprising a plurality of signal channels and a plurality of CW channels;

at least one OADM optically coupled to the at least one office; and a subscriber premises optically coupled to the at least on OADM, wherein at least one of the plurality of signal channels and at least one of the plurality of CW channels are dropped from the plurality of channels to the subscriber premises by the at least one OADM, wherein the at least one OADM comprises:

a first switchable interleaved channel separator device, comprising:

a first input port of the first switchable interleaved channel separator device, a second input port of the first switchable interleaved channels separator device, a first output port of the first switchable interleaved channel separator device, and a second output port of the first switchable interleaved channel separator device, and a second switchable interleaved channel separator device, comprising:

a first input port of the second switchable interleaved channel separator device optically coupled to the second output port of the first switchable interleaved channel separator device, a second input port of the second switchable interleaved channel separator device, a first output port of the second switchable interleaved channel separator device optically coupled to the second input port of the first switchable interleaved channel separator device, and a second output port of the second switchable interleaved channel separator device, wherein the first and second switchable interleaved channel separator devices each further comprises a separating means optically coupled to the first and second input ports of the first or second switchable interleaved channel separator device, wherein the separating means separates a first composite optical signal from the first input port of the first or second switchable interleaved channel separator device into a first set of channels and a second set of channels interleaved with the first set of channels, wherein the separating means separates a second composite optical signal from the second input port of the first or second switchable interleaved with the third set of channels, and wherein in a first state, the first output port of the first or second switchable interleaved channel separator device outputs the first and four sets of channels, and the second output port of the first or second switchable interleaved channel separator device outputs the second and third sets of channels, wherein in a second state, the first output port of the first or second switchable interleaved channel separator device outputs the second and third sets of channels, and the second output port of the first or second switchable interleaved channels separator device outputs the first and fourth sets of channels.

9. The system or claim 8, wherein the plurality of signal channels and the plurality of CW channels travel in same direction between the at least one office and the at least one OADM.

10. The system of claim 8, wherein the plurality of signal channels and the plurality of CW channels travel in different direction between the at least one office and the at least one OADM.

11. The system of claim 8, wherein the at least one office comprises a single office.

12. The system of claim 8, wherein the at least of office comprises:
   a first office, wherein the first office provides the plurality of signal channels; and a second office, wherein the second office provides the plurality of CW channels.

13. The system of claim 8, wherein the at least one office comprises:
   the separating means, wherein the separating means comprises a PBS optically coupled to the first and the second input ports of the first or second switchable interleaved channel separator devices, wherein the PBS separates the fit composite optical signal from the first input port of the first or second switchable interleaved channel separator device into the first set of channels and the second set of channels interleaved with the first set of channels, wherein the PBS separates the second composite optical signal from the second input port of the first or second switchable interleaved channel separator device into the third set of channels and the fourth set of channels interleaved with the third set of channels;
   a first AI coupled to the PBS at a face opposite to the second input port of the first or the second switchable interleaved channel separator device; and
   a second AI optically coupled to the PBS at a fact opposite to the fir input port of the first or the second switchable interleaved channel separator device,
   wherein the first and the second AI in a first state rotates a polarization of the first and third sets of channels, and wherein the first and the second AI in a second state rotates a polarization of the second and fourth sets of channels.

14. The system of claim 13, wherein the first or the second AI comprises:
   a first glass plate optically coupled to a second plate, forming a cavity therebetween;
   a first reflective coating with a first reflectivity residing inside the cavity and on the first glass plate;
   a piezoelectric element residing inside the cavity and coupled to the second plate, wherein a thickness of piezoelectric element is adjustable, wherein the thickness determines whether the first or the second AI is in the first state or the second state;
   a second reflective coating with a second reflectivity residing inside the cavity and on the piezoelectric element;
   a first waveplate with a first optical retardance residing outside the cavity and optically coupled to the first glass plate; and
   a second waveplate with a second optical retardance residing inside the cavity and optically coupled to the first and second reflective coatings, wherein a combination of values for the first reflectivity, the first optical retardance, and the second optical retardance affects spectral bandwidths for the first, second, third, and fourth sets of channels.

15. The system of claim 8, wherein the first or the second switchable interleaved channel separator device comprises:
   the separating means, wherein the sewing means comprises:
      a first birefringent plate,
      a first and second half-wave plates, each practically optically coupled to the first birefringent plate, such that the first and second half-wave plates each is capable of intercepting approximately one-half of signal from the first birefringent plate, and
      a second birefringent plate,
      a first and second half-wave plates, each practically optically coupled to the first birefringent plate, such that the first and second half-wave plates each is capable of intercepting approximately one-half of a signal from the first birefringent plate, and
   a second birefringent plate optically coupled to the first birefringent plate and to the first and second half-wave plates on a side opposite the first birefringent plate;
   a lens optically coupled to the second birefringent plate on a side opposite of the first and second half-wave plates; and
   an AI optically coupled to the lens and imposed at a distance equal to the focal length of the lens on a side opposite to the second birefringent plate, wherein the AI in a fir state rotates a polarization of the first and third sets of channels, and wherein the AI in a second state rotates a polarization of the second and forth sets of channels.

16. The system of claim 8, wherein the separating means of the film or the second switchable interleaved channel separator device comprises:
   a first PBS optically coupled to the first input port of the first or the second switchable interleaved channels separator device;
   a first set of optical rotators optically coupled to the first PBS at a face intersecting a main axis of the first or the second switchable interleaved channel separator device, the first set of optical rotators comprising a first non reciprocal optical rotator and a first reciprocal optical rotator,
   a second PBS optically coupled to the first set of optical rotators at a side opposite to the first PBS;
   an adjustable interferometer optically coupled to the second PBS at a side opposite to the first set of rotators;
   a second set of optical rotators optically coupled to the second PBS at a face not intersecting the main axis, the second set of optical rotators comprising a second non reciprocal optical rotator and a second reciprocal optical rotator,
   a third PBS optically coupled to the second set of optical rotators at a face opposite to the second PBS, wherein the third PBS is optically coupled to the second input port of the first or second switchable interleaved channels operator device at face opposite to the second set of optical rotators, wherein the third PBS is optically coupled to the second output port of the first or the second switchable interleaved channel separator device at a face not opposite to the second set of optical rotators; and an optical reflector optically coupled to the first PBS at a faced not intersecting the main axis, wherein the optical reflector is optically coupled to the first output port of the first or the second switchable interleaved channels separator device.

17. The system of claim, 16, wherein the first or second input port of the first or the second switchable interleaved channels separator device, comprises:

an optical collimator;

a birefringent walk-off plate optically coupled to the optical collimator; and an input reciprocal optical rotator intercepting a portion of light from the birefringent walk-off plate.

18. The system of claim 8, wherein the first or the second switchable interleaved channel separator device comprises:

a PBS optically coupled to the first or the second input port of the first or the second switchable interleaved channels separator device;

the separating means, wherein the separating means comprises:

a first birefringent plate optically coupled to the PBS, a set of optical rotators optically coupled to the first birefringent plate, the set of optical rotators comprising a non reciprocal optical rotator and reciprocal optical rotator, a second birefringent plate optically coupled to the set of optical rotators at a side opposite to the first birefringent plate, and an interferometer optically coupled to the second birefringent plate at a side opposite to the set of optical rotators; and a SOR optically coupled to the PBS and the first birefringent plate, wherein the SOR in a first state does not rotate a polarization of the first, second, third, or fourth set of channels, wherein the SOR in a second state rotates a polarization of the first, second, third and forth sets of channels.

19. A full-duplex optical communication system, comprising:

at least one office, wherein the at least one office provides a plurality of channels, the plurality of channels comprising a plurality of signal channels and plurality of CW channels;

at least one OADM optically coupled to the at least one office; and a subscriber premises optically coupled to the least of one OADM, wherein at least one of the plurality of signal channels and at least one of the plurality of CW channels are dropped from the plurality of channels to the subscribe premised by the at least one OADM, wherein the subscriber premises modulates the dropped at least one of the plurality of CW channels, wherein the modulated at least-one of the plurality of CW channels is added to the plurality of channels by the at least one OADM, wherein, the at least one OADM comprises:

a first switchable interleaved channel separator device, comprising:

a first input port of the first switchable interleaved channels separator device, a second input port of the first switchable interleaved channel separator device; and a second switchable interleaved channels separator device, comprising:

a first output port of the second switchable interleaved channel separator device optically coupled to the second output port of the first switchable interleave channels separator device, and a second output port of the second switchable interleaved channel separator device, wherein the first and second switchable interleaved channels separator devices each further comprises a separating means, wherein the separating means comprises:

a PBS optically coupled to the first and the second input ports of the first or second switchable interleaved channels separator devices, wherein the PBS separates a first composite optical signal from the first input port of the first or second switchable interleaved channels separator device into a first set of channels and a second set of channels interleaved with the first set of channels, wherein PBS separates a second composite optical signal from the second input port of the first or second switchable interleaved channels separator device into a third set of channels and a forth set of channels interleaved with the third set of channels, a first adjustable interferometer optically coupled to the PBS at a face opposite to the second input port of the first or the second switchable interleaved charmer separator device, and a second adjustable interferometer optically coupled to the PBS at a face opposite to the first input port of the first or the second switchable interleaved channel separator device, wherein the first and the second adjustable interferometer in a first state rotates a polarization of the first and third sets of channels, and wherein the first and the adjustable interferometer in a second state rotates a polarization of the second and fourth sets of channels.

20. The system of claim 19, wherein the plurality of signal channels and the plurality of CW channels travel in a same direction between the at least one office and the at least one OADM.

21. The system of claim 19, wherein the plurality of signal channels and the plurality of CW channels travel in different directions between the at least one office and the at least one OADM.

22. The system of claim 19, wherein the at least one office comprises a single office.

23. The system of claim 19, wherein the at least one office comprises:

a first office, wherein the first office provides the plurality of signal channels; and a second office, wherein the second office provides the plurality of CW channels.

24. The system of claim 19, wherein the first or the second adjustable interferometer each comprises:

a first glass plate optically coupled to a second plate, forming a cavity therebetween;

a first reflective coating with a first reflectivity residing inside the cavity and on the first glass plate;

a piezoelectric element residing inside the cavity and coupled to the second plate, wherein a thickness of the piezoelectric element is adjustable, wherein the thickness determines whether the first or the second adjustable interferometer is in the first state or the second state;

a second reflective coating with a second reflectivity residing inside the cavity and on the piezoelectric element;

a first waveplate with a first optical retardance residing outside the cavity and optically coupled to the first glass plate; and a second waveplate with a second optical retardance residing inside the cavity and optically coupled to the first and second reflective coatings, wherein a combination of values for the first reflectivity, the first optical retardance, and the second optical retardance affects spectral bandwidth for the first, second, third, and fourth sets of channels.

25. A full-duplex optical communications system, comprising:

at least one office, wherein the at least one office provides a plurality of channels, the plurality of channels comprising a plurality of signal channels and a plurality of CW channels;

at least one OADM optically coupled to the at least one office; and a subscriber premises optically coupled to the at least one OADM, wherein at least one of the plurality of signal channels and at least one of the plurality of CW channels are dropped from the plurality of channels to the subscriber premises by the at least one OADM, wherein the subscriber premises modulated the dropped at least one of the plurality of CW channels, wherein the modulated at least one of the plurality of CW channels is added to the plurality of channels by the at least one OADM, wherein the at least one OADM comprises:
a first switchable interleaved channel separator device, comprising:
a first input port of the first switchable interleaved channel separator device,
a second input port of the first switchable interleaved channel separator device,
a first output port of the first switchable interleaved channel separator device, and
a second output port of the first switchable interleaved channels separator device; and
a second switchable interleaved channel separator device, comprising
a first input port of the second switchable interleaved channel separator device optically coupled to the second output port of the first switchable interleaved channel separator device,
a second input port of the second switchable interleaved channel separator device,
wherein the first and second switchable interleaved channel separator devices each further comprises:
a separating means optically coupled to the first and second input ports of the first or second switchable interleaved channel separator device, wherein the se prang means separates a first composite optical signal from the first input port of the first or second switchable interleaved channel separator device into a first set of channels and a second set of channels interleaved with the first set of channel, wherein the separating means separates a second composite optical signal from the second input port of the first or second switchable interleaved channel separator device into a third set of channels and a fourth set of channels interleaved with the third set of channels, wherein the separating means comprises:

a first birefringent plate,
a first and second half-wave plates, each partially optically coupled to the first birefringent plate, such that the first and second half-wave plates each is capable of intercepting approximately one-half of a signal from the first birefringent plate, and
a second birefringent plate optically coupled to the first birefringent plate and to the first and second half-wave plates on a side opposite to the first birefringence plate,
a lens optically coupled to the second birefringence plate on a side opposite to the first and second half-wave plates, and
an adjustable interferometer optically coupled to the lens and disposed at a distance equal to the focal length of the lens on a side opposite to the second birefringent plate, wherein the adjustable interferometer in a first state rotates a polarization of the first and third sets of channels, and wherein the adjustable interferometer in a second state rotates a polarization of the second and fourth sets of channels.

26. The system of claim 25, wherein the plurality of signal channels and the plurality of CW channels travel in a same direction between the at least one office and the at least one OADM.

27. The system of claim 25, wherein the plurality of signal channels and the plurality of CW channels travel in different direction between the at least one office and the at least one OADM.

28. The system of claim 25, wherein the at least one office comprises a single office.

29. The system of claim 25, wherein the at least one office comprises:
a first office, wherein the first office provides the plurality of signal channels; and
a second office, wherein the second office provides the plurality of CW channels.

30. A full duplex optical communication system comprising:

at least one office, wherein the at least of office provides a plurality of channels, the plurality of channels comprising plurality of signal channels and plurality of CW channels;

at least one OADM optically coupled to the least one office; and a subscriber premises optically coupled to the at least one OADM, wherein at least one of the plurality of signal channels and at least one of the plurality of CW channels are dropped from the plurality of channels to the subscriber premises by the at least one OADM, wherein the subscriber premises modulated the dropped at least one of the plurality of CW channels, wherein the modulated at least one of the plurality of CW channels is added to the plurality of channels by the at least one OADM, wherein the at least one OADM comprise:
a first switchable interleaved channel separator device, comprising:
a first input port of the first switchable interleaved channel separator device,
a second input port of the first switchable interleaved channels separator device,
a first output port of the first switchable interleaved channels separator device, and a second output part of the first switchable interleaved channels separator device; and
a second switchable interleaved channels separator device, comprising:
a first input port of the second switchable interleaved channel separator device optically coupled to the second out
a second input port of the second switchable interleaved channels separator device,
a first output port of the second switchable interleaved channel separator device optically coupled to the second input port of the first switchable interleaved channel separator device, and
a second output port of the second switchable interleaved channels separator device,
wherein the first and second switchable interleaved channel separator devices each further comprises a separating means, wherein the separating means comprises:
a first PBS optically coupled to the first input port of the first or the second switchable interleaved channels separator device,
a first set of optical rotators optically coupled to the first PBS at a face intersecting a main axis of the first or the second switchable interleaved channel separator device, the first set of optical rotators comprising a first non reciprocal optical rotator and first reciprocal optical rotator,
a second PBS optically coupled to the first set of optical rotators at a side opposite to the first PBS,
an adjustable interferometer optically coupled to the second PBS at a side opposite to the first set of rotators,
a second set of optical rotators optically coupled to the second PBS at a face not intersecting the main axis, the second set of optical rotators comprising a second non reciprocal optical rotator and a reciprocal optical rotator,
a third PBS optically coupled to the second set of optical rotators at a face opposite to the second switchable interleaved channels separator device at a face opposite to the port of the first or second switchable interleaved channels separator device at a face not opposite to the second set of optical rotators, and
an optical reflector optically coupled the first PBS at a face on the intersecting the main axis, wherein the optical reflector is optically coupled to the first output port of the first or the second switchable interleaved channel separator device.

31. The system of claim 30, wherein the plurality of signal channels and the plurality of CW channels travel in a same direction between the at least one office and the at least one OADM.

32. The system of claim 30, wherein the plurality of signal channels and the plurality of CW channels travel in different direction between the at least one office and the at least one OADM.

33. The system of claim 30, wherein the at least one office comprises a single office.

34. The system of claim 30, wherein the at least one office comprises:
a first office, wherein the first office provides the plurality of signal channels; and
a second office, wherein the second office provides the plurality of CW channels.

35. The system of claim 30, wherein the first or second input port of the first or the second switchable interleaved channel separator device or the first or second output port of the first or the second switchable interleaved channels separator device, comprises:
a optical collimator,
a birefringent walk-off plate optically coupled to the optical collimator; and
an input reciprocal optical rotator intercepting a portion of a light from the birefringent walk-off plate.

36. A full-duplex optical communication system comprising:
at least one office, wherein the at least one office provides a plurality of channels, the plurality of channels comprising a plurality of signal channels and a plurality of CW channels;
at least one OADM optically coupled to the at least one office; and
a subscriber premises optically coupled to the at least one OADM, wherein at least one of the plurality of signal channels and at least one of the plurality of CW channels are dropped from the plurality of channels to the subscriber premises by the at least one OADM,
wherein the subscriber premises modulates the dropped at least one of the plurality of CW channels, wherein the modulated at least one of the plurality of CW channels is added to the plurality of channels by the at least one OADM,
wherein the at least one OADM comprises:
a first switchable interleaved channel separator device, comprising:
a first input port of the first switchable interleaved channel separator device,
a second input port of the first switchable interleaved channel separator device,
a first output port of the first switchable interleaved channel separator device; and
a second output port of the first switchable interleaved channel separator device; and
a second switchable interleaved channel separator device, comprising:
a first input port of the second switchable interleaved channel separator device optically coupled to the second output port of the first switchable interleaved channel separator device,
a second input port of the second switchable interleaved channel separator device,
a first output port of the second switchable interleaved channel separator device optically coupled to the second input port of the first switchable interleaved channel separator device, and
a second output port of the second switchable interleaved channel separator device,
wherein the first and second switchable interleaved channel separator devices each further comprises:
a PBS optically coupled to the first or the second input port of the first or the second switchable interleaved channel separator device,
a separating means, wherein the separating means separates a first composite optical signal from the first input port of the first or second switchable interleaved channel separator device into a first set of channels and a second set of channels interleaved with the first set of channels, wherein the separating means separates a second composite optical signal from the second input port of the first or second switchable interleaved channel separator device into a third set of channels and a fourth set of channels interleaved with the third set of channels, wherein the separating means comprises:
a first birefringent plate optically coupled to the PBS,
a set of optical rotators optically coupled to the first birefringent plate, the set of optical rotators comprising a non reciprocal optical rotator and a reciprocal optical rotator,
a second birefringent plate optically coupled to the set of optical rotators at a side opposite to the first birefringent plate, and
an interferometer optically coupled to the second birefringent plate at a side opposite to the set of optical rotators, and
a SOR optically coupled to the PBS and the first birefringent plate, wherein the SOR in a first state does not rotate a polarization of the first, second, third, or fourth set of channels, wherein the SOR in a second state rotates a polarization of the first, second, third, and fourth sets of channels.

37. The system of claim 36, wherein the plurality of signal channels and the plurality of CW channels travel in a same direction between the at least one office and the at least one OADM.

38. The system of claim 36, wherein the plurality of signal channels and the plurality of CW channels travel in different directions between the at least one office and the at least one OADM.

39. The system of claim 36, wherein the at least one office comprises a single office.

40. The system of claim 36, wherein the at least one office comprises:
a first office, wherein the first office provides the plurality of signal channels; and
a second office, wherein the second office provides the plurality of CW channels.

41. A full-duplex optical communications system, comprising:
at least one office, wherein the at least one office provides a plurality of channels, the plurality of channels comprising a plurality of signal channels and a plurality of CW channels;
at least one OADM optically coupled to the at least one office, wherein the at least one OADM comprises:
a first switchable interleaved channel separator device, comprising:
a first input port of the first switchable interleaved channel separator device,
a second input port of the first switchable interleaved channel separator device,
a first output port of the first switchable interleaved channel separator device, and
a second output port of the first switchable interleaved charnel separator device, and
a second switchable interleaved channel separator device, comprising:
a first input port of the second switchable interleaved channel separator device optically coupled to the second output port of the first switchable interleaved channel separator device,
a second input port of the second switchable interleaved channel separator device,
a first output port of the second switchable interleaved channel separator device optically coupled to the second input port of the first switchable interleaved channel separator device, and
a second output port of the second switchable interleaved channel separator device,
wherein the first and second switchable interleaved channel separator devices a first optical signal from the first input port of the first or second switchable interleaved channel separator device into a first set of channels and a second set of channels with the first set of channels,
wherein the first and second switchable interleaved channel separator devices separates a second optical signal from the second input port of the first or second switchable channel separator device into a third set of channels and a fourth set of channels with the third set of channels, and
wherein in a first stale, the first output port of the first or second switchable channel separator device outputs the first and fourth sets of channels, and the output port of the first or second switchable interleaved channel separator device the second and third sets of channels,
wherein in a second state, the first output port of the first or second switchable interleaved channel separator device outputs the second and third sets of channels, and the second output port of the first or second switchable interleaved channel separator device outputs the first and fourth sets of channels; and
a subscriber premises optically coupled to the at least one OADM, wherein at least one of the plurality of signal channels and at least one of the plurality of CW channels are dropped from the plurality of channels to the subscriber premises by the at least one OADM, wherein the subscriber premises modulates the dropped at least one of the plurality of CW channels, wherein the modulated at least one of the plurality of CW channels is added to the plurality of channels by the at least one OADM.

42. The system of claim 41, wherein the first or the second switchable interleaved channel separator device comprises a Mach-Zehnder interferometer.

43. The system of claim 42, wherein the Mach-Zehnder interferometer comprises bulk optical components.

44. The system of claim 42, wherein the Mach-Zehnder interferometer comprises fused optical fibers.

45. The system of claim 42, wherein the Mach-Zehnder interferometer comprises a planar lightwave circuit.

46. The system of claim 41, wherein the first or the second switchable interleaved separator device comprises a switchable wavelength router.

47. The system of claim 41, wherein the first or the second switchable interleaved separator device comprises a programmable wavelength router.

* * * * *